United States Patent
Bächer et al.

(10) Patent No.: US 11,029,664 B2
(45) Date of Patent: Jun. 8, 2021

(54) COMPUTER-ASSISTED DESIGN AND FABRICATION OF KINETIC WIRE MECHANISMS

(71) Applicant: DISNEY ENTERPRISES, INC., Burbank, CA (US)

(72) Inventors: Moritz Bächer, Zürich (CH); Stelian Coros, Zürich (CH); Lars Espen Knoop, Zürich (CH); Hongyi Xu, Zürich (CH)

(73) Assignee: Disney Enterprises, Inc., Burbank, CA (US)

(*) Notice: Subject to any disclaimer, the term of this patent is extended or adjusted under 35 U.S.C. 154(b) by 531 days.

(21) Appl. No.: 15/958,109

(22) Filed: Apr. 20, 2018

(65) Prior Publication Data

US 2019/0324424 A1 Oct. 24, 2019

(51) Int. Cl.
*G05B 19/4097* (2006.01)
*G06F 30/00* (2020.01)
*G06F 113/16* (2020.01)
*G06F 119/18* (2020.01)

(52) U.S. Cl.
CPC ......... *G05B 19/4097* (2013.01); *G06F 30/00* (2020.01); *G05B 2219/35134* (2013.01); *G05B 2219/36203* (2013.01); *G06F 2113/16* (2020.01); *G06F 2119/18* (2020.01)

(58) Field of Classification Search
CPC ...... G05B 19/4097; G05B 2219/36203; G05B 2219/35134; G06F 30/00; G06F 2113/16; G06F 2119/18; G06F 30/20; Y02P 90/02
See application file for complete search history.

(56) References Cited

U.S. PATENT DOCUMENTS

| | | | |
|---|---|---|---|
| 2004/0072120 A1* | 4/2004 | Lauren | A61C 7/20 433/24 |
| 2009/0135189 A1* | 5/2009 | Kim | G06T 13/40 345/473 |

* cited by examiner

*Primary Examiner* — Saif A Alhija
(74) *Attorney, Agent, or Firm* — Snell & Wilmer L.L.P.; Kent A. Lembke

(57) ABSTRACT

Methods and corresponding systems that are useful in design and fabrication of kinetic wire mechanisms or characters. The method includes a computational technique for the design of kinetic wire mechanisms tailored for fabrication on consumer-grade hardware such as a desktop CNC bending device. The method takes as input a skeletal animation of the mechanism to be fabricated and estimates, from the skeletal animation, a cable-driven and compliant wire structure, which matches user-selected keyframes. To enable localized deformations, the technique involves shaping the mechanism's body (i.e., the wire) into functional spring-like entities at a set of locations along the length of the mechanism's body. The method involves determining where on the wire body to place these spring-like entities, determining which types or configurations of spring-like entities should be placed at each of these locations, and optimizing parameters of each user-selected spring-like entity for use at the locations on the wire mechanism.

18 Claims, 22 Drawing Sheets

COMPUTER-ASSISTED DESIGN AND FABRICATION OF KINETIC WIRE MECHANISMS

BACKGROUND

1. Field of the Description

The present description relates, in general, to structures or mechanisms formed of wire or having a wire skeletal structure, and, more particularly, to a computer-assisted design and fabrication method for wire structures or mechanisms that are compliant so that they can be actuated to bend to two or more positions without plastic deformation. Such compliant and actuated wire structures can be labeled "kinetic wire mechanisms" and can be used to provide animated characters or characters with moving body parts.

2. Relevant Background

There are numerous applications for mechanisms and structures that are fabricated from wire or include a wire support structure or skeleton, and it is often desirable that these wire mechanisms be designed for actuation or driven movement or to be kinetic wire mechanisms. Such kinetic wire mechanisms can be used to provide an animated character for a show or display. By manually bending and assembling individual wire components, sculptors have mastered the art of designing wire characters that consist of rigid wire components jointed together at their ends. However, these assemblies usually are not compliant and are very time consuming to create, with their functioning and design being difficult to repeat and relying upon the skill and experience of the sculptor. There remains a need for automated or computer-assisted design tools for use in designing and fabricating kinetic wire mechanisms.

Industrial-grade bending machines, e.g., computer numerical control (CNC) bending devices, have existed for decades, but they have mainly been used to manufacture elastic springs, which are mechanical components that have become an integral part of virtually every mechanism or machine since the industrial revolution. Typically made of spring steel, these elastic springs excel in their ability to achieve large elastic deformations within a small volume while accumulating small local strains along the length of the wire.

Affordable desktop bending devices have only recently become available, and these enable a broader audience to bend custom shapes at home. Fed with prefabricated wire, these devices build lightweight structures within minutes that have strength and fatigue properties far exceeding those of three dimensional (3D) printed parts. However, due to the difficulty of interconnecting wire components with traditional joints such as hinges, traditional kinetic wire assemblies are ill-suited for the automated fabrication on these newer desktop bending devices.

When compared to conventional mechanisms, elastically deforming wire mechanisms have many desirable properties including being inexpensive and lightweight while also providing excellent strength and fatigue properties. Unique to kinetic wire mechanisms is that stress can be relieved by locally elongating the wire such as by winding or bending a shape with a particular homogenized stiffness. Despite these favorable properties, there presently are no tools to aid in the design of kinetic wire mechanisms, which are made up of wire segments and spring-like entities, are tailored to the device-assisted fabrication on CNC bending machines, and achieve a desired complex spatial motion when actuated by cables or the like. Hence, there remains a need for a computational tool that aids the non-expert as well as the expert engineer with the design of kinetic wire sculptures or mechanisms, and it is preferable that this tool be configured to provide designs that are specifically tailored for the rapid, device-assisted fabrication performed by wire bending machines.

SUMMARY

Briefly, methods (and corresponding systems implementing such methods) are described herein that are useful in design and fabrication of kinetic wire mechanisms or characters. The inventors recognized that elastically deforming wire structures, which are lightweight and durable, can be fabricated or bent within minutes through the use of a CNC or other bending machine. The methods described include a computational technique for the design of kinetic wire characters or mechanisms that are tailored for fabrication on consumer-grade hardware such as a desktop CNC bending device but, of course, can also be formed or bent with an industrial-grade bending device.

The computational technique takes as input a skeletal animation of the mechanism or character to be fabricated. The technique then estimates, from the skeletal animation, a cable-driven (or otherwise actuated) and compliant wire structure, which matches user-selected targets or keyframes (i.e., additional inputs) as closely as possible. To enable large localized deformations, the technique involves shaping the mechanism's body (i.e., the wire) into functional spring-like entities at a discrete set of locations along the length of the mechanism's body. In this regard, the technique first detects regions where changes to local stiffness properties are needed to provide the movements of the input animation, and these regions are replaced with bendable entities of varying shape and size. To avoid a discrete optimization, the inventors decided to have the technique include a step to optimize stiffness properties of generic, non-fabricable entities, which capture the behavior of the bendable designs/entities. To co-optimize stiffness properties and cable (or other actuation) forces, the technique formulates an equilibrium-constrained minimization problem, which safeguards against inelastic deformations. The design and fabrication method described herein has been demonstrated practical and useful, with three fabricated examples being discussed that showcase rich behavior of the wire mechanisms including large deformations and complex spatial motion.

More particularly, a system is provided for design and fabrication of kinetic wire mechanisms. The system includes memory or a data storage storing a skeletal animation of an object. A system controller (e.g., a computing device) is provided that runs a design module that processes the skeletal animation to generate a model of the object. During use of the system, the design module receives user input identifying a set of keyframes in the skeletal animation that define poses for the object, and the design module processes the set of keyframes to determine locations or regions for spring-like entities on the model of the object. The data storage further stores a database of fabricable templates of the spring-like entities (e.g., components or elements that can be formed of a length of wire and have spring functionality including being able to be elastically deformed), and the design module identifies a set of the fabricable templates for each of the determined locations.

Further, during use of the system, the design module receives user input selecting one of the fabricable templates from each of the sets of the fabricable templates that display a similar behavior, and the design module inserts the selected one of the fabricable templates at a corresponding one of the determined locations. The system further includes a wire bending machine, and the wire bending machine operates to bend an input length of wire based on the model of the object to fabricate a kinetic wire mechanism including a plurality of spring-like entities with locations and configurations matching those of the fabricable templates inserted into the model of the object.

In some embodiments, the design module determines the locations for the spring-like entities by optimizing local stiffness properties for the model during movement through the poses defined in the set of keyframes. A generic template is provided, by the design module, in the model at each of the determined locations, and the design module optimizes parameters of the generic templates to allow the model to move through the poses matching a set of target points on the object. The design module identifies the sets of fabricable templates by comparing the deformation behavior of each of the fabricable templates in the database with the optimized deformation behavior of the generic templates in the model. The design module inserts one of the fabricable templates of each of the sets of the fabricable templates at corresponding ones of the identified locations in the model and optimizes one or more of the parameters for each of the fabricable templates in the model.

In some implementations of the system, the fabricable templates in the database include a plurality of polygonal templates of spring-like entities with increasing number of sides and a plurality of twin templates of spring-like entities each including two isosceles trapezoids.

DETAILED DESCRIPTION

Figure 1:
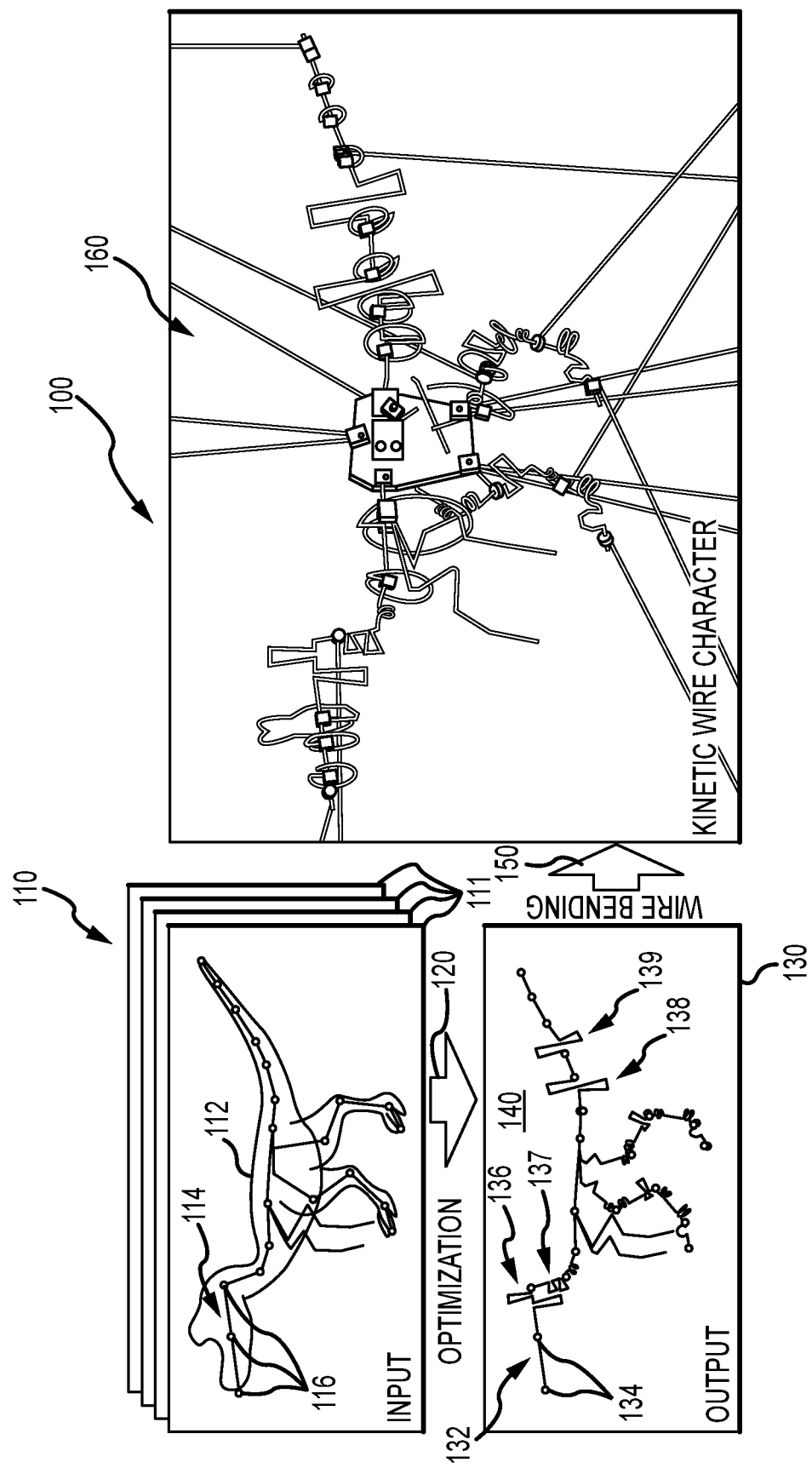
FIG. 1 is a process flow diagram of a method of design and fabrication of kinetic wire mechanisms according to the present description.

In brief, a computational tool is provided that can be used in a design and fabrication system for kinematic wire mechanisms or characters. The computational tool (or method performed by a computer running code or executing instructions/programs) takes as input a skeletal animation and automatically generates a cable driven (or otherwise actuated in some embodiments) kinetic wire structure that is ready for the device-assisted fabrication. For example, the output of the computational tool or mechanism design can be used to fabricate a kinetic wire mechanism using a CNC bending machine or other bending device or using a 3D printer. The wire mechanisms do not consist of rigid components jointed together with, for example, mechanical hinges, but, instead, the wire mechanisms are compliant and elastically deforming. The computational tool is configured to automatically place and size fabricable, spring-like entities along the length of the mechanism's body (i.e., a length of wire or two or more lengths of wire) such that the kinetic wire mechanism can be animated/actuated to closely match a set of user-selected keyframes or target poses.

The inventors developed a set of fabricable template types (e.g., templates of spring-like entities that can be formed by a CNC bending machine) that provide the wire (or mechanism body) with a wide variety of differing stiffness properties to approximate a rich global deformation behavior. It was further understood by the inventors that deciding where to place these templates and what type of template to use at each particular location along the wire (or length of the mechanism body) are discrete questions. A direct exploration of this exponential design space is intractable.

Hence, to answer these discrete questions, the inventors developed a three-stage continuous optimization, solving three instances of the same minimization problem over varying design parameters. First, the computational tool (or design and fabrication method) answers the binary question of where along the wire the spring-like entities are needed, and this may be determined by optimizing homogenized stiffness properties. Second, the computational tool optimizes a generic template. This may involve replacing detected regions with generic, non-fabricable templates, which capture the behavior of the fabricable designs well, and, then, the computational tool acts to optimize their parameters to calibrate their stiffness. Third, to replace the generic, non-fabricable templates with templates of spring-like entities that can be fabricated, the computational tool compares each of the generic template's deformation behavior with a similarity metric to pre-build a database for fast retrieval of function-preserving, bendable types and corresponding parameters.

To provide the user of the computational tool with fabricable options of varying volumetric footprint and appearance, behaviorally-redundant designs may be supported (e.g., by providing more than one fabricable spring-like entity template or design matching at least some of the generic, non-fabricable templates). The retrieved parameters can then be refined under strict fabricability restraints. Further, the computational tool may be configured to co-optimize design parameters together with cable forces that act at a few user-specified locations along the wire/mechanism body, and the co-optimizing may involve constraining deformations to static equilibria and the elastic regime (e.g., safeguard against plastic deformation after fabrication). As input, one useful embodiment of the computational tool makes use of standard skeletal animations (e.g., traditional rigs). Hence, the computational tool may be adapted to interface with other software tools (e.g., Maya) that 3D artists are familiar with so as to enable them to efficiently and effectively design complex kinetic wire mechanisms.

Prior to discussing details of implementing the computational tool, it may be useful to provide an overview of its workings. FIG. 1 provides a process flow diagram 100 of the method of design and fabrication of a kinetic wire mechanism that may be carried out by a system that includes a computational tool (or a wire mechanism design tool implemented with software or code running on a computer/controller of a design and fabrication system). As shown, a user of the system selects or generates input 110 in the form of a skeletal animation of an animated character or object 112, with a dinosaur shown in FIG. 1 as an example. The skeletal animation or input 110 includes a number of user-selected targets or keyframes 111 defining a set of poses for the character/object 112 that the user desires a wire mechanism to be able to implement or perform. The input 110 includes a skeleton or rigging assembly 114 (e.g., a set of interconnected links in the animated object) with a set of target points 116 that may be chosen by the user of the system and are used by the computational tool in designing a kinetic wire mechanism.

As shown, the input 110 is processed with the computational tool performing optimization as shown at 120 to produce an output in the form of a model of a cable-driven kinetic wire mechanism or structure. Specifically, the model/output 130 includes a body (e.g., a length(s) or segment(s) of wire) 132 with target points matching those of the input skeleton 114. Along the wire body 132, the optimization/processing 120 has inserted a set/number of fabricable spring-like entities 136, 137, 138, and 139 and provided connections for a set/number of cables 140 that can be used to actuate or drive the wire body 132 into each of the poses defined in the keyframes 111. The process flow 100 continues with the output/model 130 being provided as control input to a wire bending machine (e.g., a desktop CNC bending machine or the like) that performs wire bending as shown with arrow 150 to produce a kinetic wire character 160 by bending the wire making up its body to form a set of spring-like entities at predefined locations along the wire body.

The process flow 100 of FIG. 1 is a departure from designing static wire structures. The computational tool uses a technique that estimates elastically deforming kinetic characters from rigged input 110 utilizing the ability of spring-like entities, such as entities 136, 137, 138, and 139, to approximate a wide range of stiffnesses. The cable-actuated or posable output model 130 well approximates a set of user-specified target poses or keyframes 111 under small actuation forces, as can be seen with target points 116 on rigging assembly/skeleton 114 and simulated positions 134 in the model 130, without the use of traditional joints. While a direct fabrication of a rig is possible, local stresses would exceed the yield strength for all but trivial targets. While plastic deformation is essential during the fabrication process, inelastic deformation is generally intolerable after fabrication. Unique to kinetic wire sculptures is that stress can be relieved by locally elongating the wire, winding or bending it into a shape with a particular, homogenized stiffness. However, minimizing the maximal stress by naively extending the wire leads to non-fabricable results with poor target matching performance due to local minima. Favoring the controlled placement of generalized springs, the inventors faced discrete questions of where to best introduce springs and which spring-like entity to use, with nonlinearities in both geometry and material behavior further complicating matters.

To navigate this complex design space, the inventors propose a novel, three-stage continuous optimization, minimizing a target matching objective over the following three design parameters: (1) first answer the binary question of where along the wire body one or more spring-like entities are needed by optimizing homogenized stiffness properties; (2) to answer the discrete question of which spring-like entity to use in each location, the computational tool is designed to replace detected regions with generic non-fabricable entities that capture the behavior of predefined fabricable spring-like entities well and optimized their parameters to calibrate their stiffness; and (3) to replace generic with fabricable entities, the computational tool compares their deformation behavior with a similarity metric, pre-building a database for fast retrieval of function-preserving, bendable types and corresponding parameters.

With regard to this third design parameter, the computational tool may be designed to support behaviorally-redundant designs to provide the user with fabricable options of varying volumetric footprint and appearance. While closely matching targets already, the retrieved parameters may be further refined under strict fabricability constraints. The design parameters are co-optimized together with cable/actuation forces that act at a few locations along the wire (which may be user selected) to constrain deformations to static equilibria and the elastic regime. The inventors used the approach taught herein to design and fabricate a motor-driven kinetic dinosaur, a manually-controlled kinetic hand, and a posable magnetic climber, and this demonstrated that rich global behavior that can be achieved by locally shaping the wire body into spring-like entities of desired stiffness, size, and visual appeal. The prototypes validated the design and fabrication method on input with large deformations and complex spatial motion.

Figure 2:
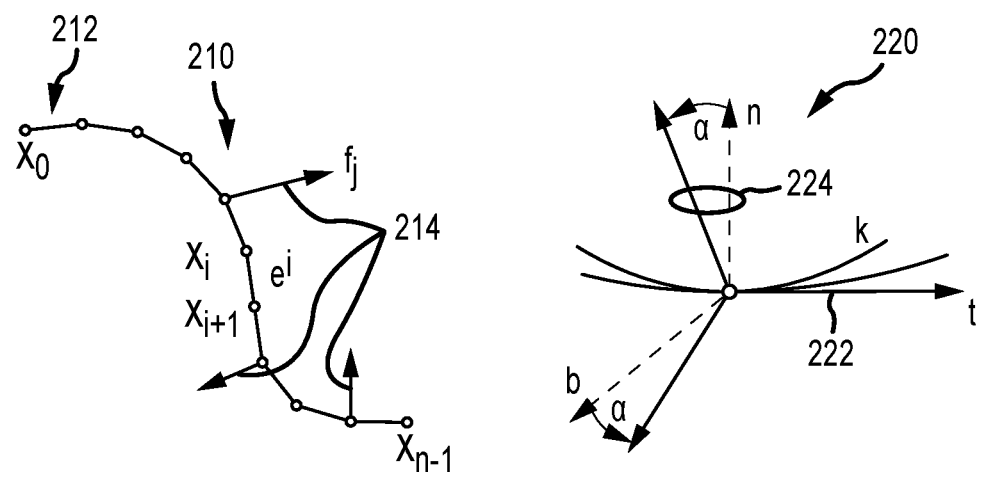
FIG. 2 illustrates two diagrams showing discretizing of a wire model performed as part of the method of design and fabrication of the present description.

The computational tool performs its processing and/or optimization in part by simulating elastic wire. With reference to the diagrams 210, 220 of wire models of FIG. 2, it can be seen that wire models can be discretized with n nodes $x_i$ and n−1 edges $e^i$ (see diagram 210), holding a sufficient set of degrees of freedom fixed (as shown at 212 and 222) when quasi-statically simulating its elastic behavior under a sparse set of cable forces $f_j$ (as shown at 214 and 224). The angle α and vector κ measure the twist and curvature in the material frame [t, n, b] with tangent t, normal n, and binormal b (see diagram 220).

In some embodiments, a discrete rod model (such as the discrete rod model introduced by Bergou et al. [2010; 2008]) may be used to simulate elastically deforming wire. Discretized into n nodes $x_i$ and n−1 segments $e^i = x_{i+1} - x_i$ (compare with diagram 220 of FIG. 2), the standard stretch, isotropic bending, and twist potentials may be used as follows:

$$E_s(x) = \frac{1}{2}\sum_{i=1}^{n-1} k_s \varepsilon_i^2 \|\bar{e}^i\|$$

$$E_b(x) = \frac{1}{2}\sum_{i=1}^{n-2} \frac{1}{\bar{l}_i}(\kappa_i - \bar{\kappa}_i)^T B(\kappa_i - \bar{\kappa}_i) \text{ with } B = k_b I$$

$$E_t(x) = \frac{1}{2}\sum_{i=1}^{n-2} k_t \frac{(\alpha_i - \bar{\alpha}_i)^2}{\bar{l}_i}$$

integrating the strain ε, curvature $\kappa = [\kappa^n, \kappa_b]^T$, and twist a along the wire. Because the rest configuration of the bent wire is curved, the rest curvature $\bar{\kappa}_i$ and twist $\bar{\alpha}$ are substracted, dividing by the nodal integration domain $\bar{l}_i$. Enforcing the inextensibility of wire with constraints $e^i \cdot e^j = \bar{e}^i \cdot \bar{e}^j$, the stretch energy $E_s$ is used to emulate the homogenized stiffness of the wire templates.

Holding a sufficient set of degrees of freedom fixed, a wire model is simulated with unknown centerline nodes $x \in \mathbb{R}^{3n}$ by minimizing the total energy:

$$E(x, f) = E_s(x) + E_b(x) + E_t(x) - f^T(x - \bar{x})$$

subtracting the external work performed by cable forces $f \in \mathbb{R}^{3n}$, to static equilibrium. To avoid a dense Hessian, E can be minimized with additional per-edge parameters (referring the reader to the original text of Bergou et al.).

Figure 12:
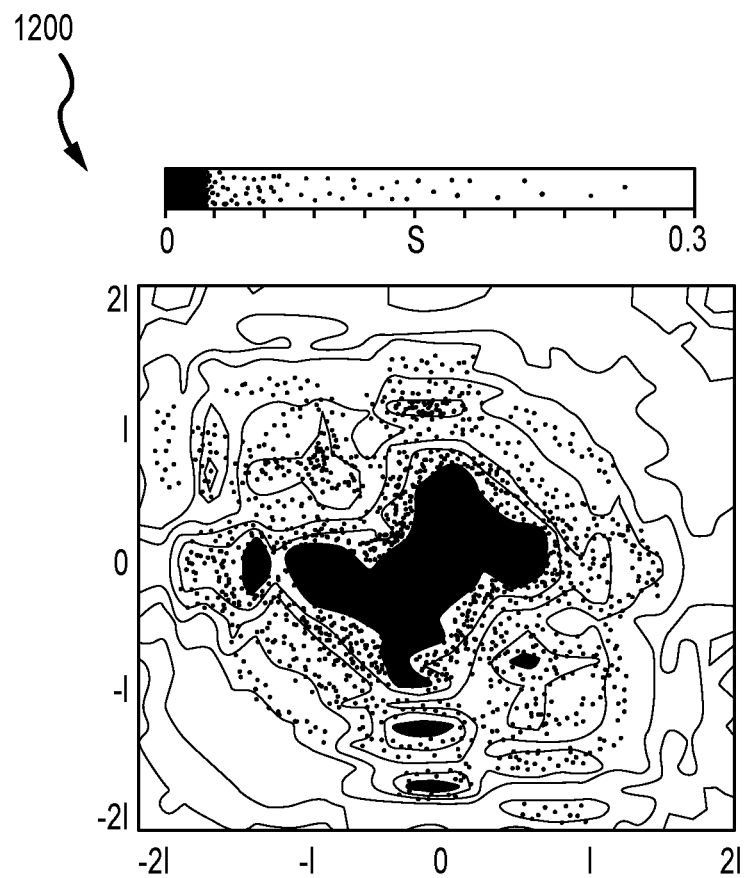
FIG. 12 is a plot of contours of the minimum score across all types of templates and corresponding parameter samples when varying the height parameters of the generic template in allowable ranges.

The bending machine can be fed with wire of constant radius r and cross-section $A = \pi r^2$, with twist and bending stiffnesses:

$$k_t = G\frac{Ar^2}{2} \text{ and } k_b = E\frac{Ar^2}{4}$$

where G and E denote the shear and Young's moduli of the material. While metal is virtually unstretchable, the stretch stiffness $k_s = EA$ can be used to provide the reader with intuition when discussing the material optimization. As illustrated in FIG. 12, the standard elastic rod model predicts large elastic deformations of kinetic wire models with high accuracy.

Figure 3:
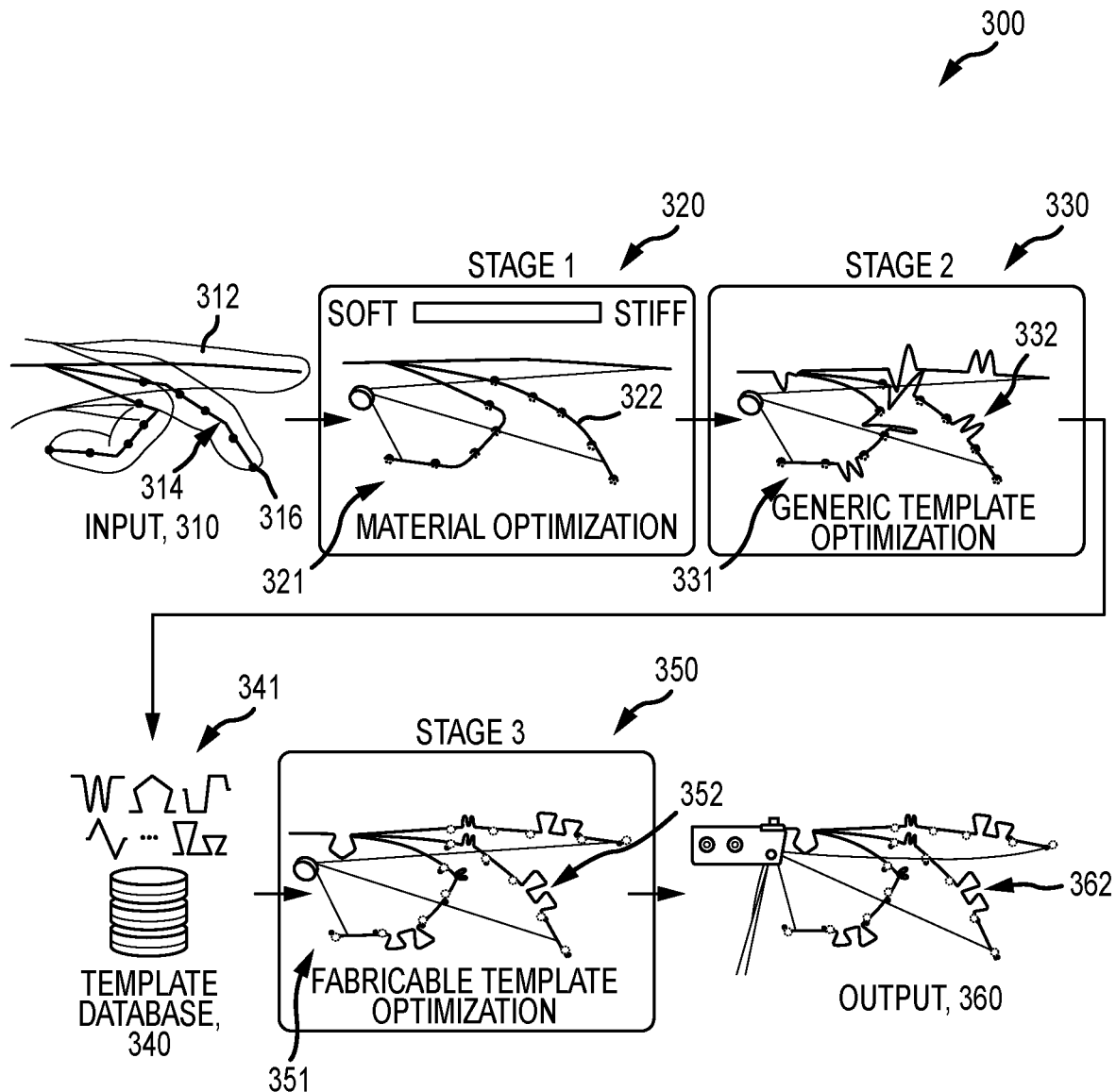
FIG. 3 illustrates a process flow diagram of a method of design and fabrication of a kinetic wire mechanism in the form of a kinetic hand.

With regard to designing kinetic wire models, one overall goal is to optimally place and size fabricable templates to well approximate a set of corresponding marker positions on user-specified targets t, applying cable forces at a sparse set of dedicated locations (compare input and output in FIG. 3). Representing the templates with design parameters p, one can aim at optimizing the target matching objective:

$$f_{target}(p, f) = \frac{1}{2}\sum_t \|Sx^t(p, f^t) - \hat{x}^t\|^2$$

minimizing the distance between simulated and desired targets when varying both the design parameters p and per-target force parameters $f^t$. S is a constant selection matrix, extracting marker positions from the centerline nodes $x^t \in \mathbb{R}^{3n}$, simulated to static equilibrium under forces $f^t$.

Under forces acting at a sufficiently dense set of locations along the wire model, arbitrary targets can be matched. However, this would render fabrication an infeasible endeavor. Instead, the inventors decided to place the user in control by asking them to specify the number of cables and their dedicated location of action along the wire. Thus, the design complexity is shifted to the controlled elongation of wire. The fewer cables available the more challenging the design task. Driven by motors or pulled on by a user, the trade-off between force magnitude and length of wire is an important design choice. With the cable force objective:

$$f_{cable}(f) = \frac{1}{2}\sum_t \|f^t\|^2$$

providing the user with control over this trade off.

While plasticity enables the fabrication of the wire models, it is important to safeguard against plastic deformations after fabrication, guaranteeing that the wire models return to their optimized rest configurations if cable forces are released. The maximum von Mises stress $\sigma_v$ is kept within cross-sections corresponding to centerline nodes $x_i^t$, below the yield strength $\sigma_{yield}$ of the material:

$$\max_{t,i} \sigma_v(x_i^t(p, f^t)) \leq \sigma_{yield}$$

By varying design parameters p, the inventors aim at changing the wire model's rest configuration $\bar{x}$, elongating the wire at a discrete and sparse set of locations. As mentioned above, controlled extensions are inserted that are shaped into spring-like entities of varying shape and size. However, while the parameters of a particular fabricable template are continuous, the question of where to place a template and which of the |T| templates to use is discrete in nature. Representing the latter with discrete variables $p \in \{0, 1, \ldots, |T|\}$ where 0 denotes the no-template case, one is faced with a design space of exponential complexity, prohibitively expensive to explore with a naive discrete optimization. The dependence of continuous template parameters on the values of variables p, further complicates matters.

To navigate this complex design task, the inventors propose a three-stage design optimization where one can minimize the instances of the problem ("generic design problem"):

$$\min_{p,f} f(p, f) + R(p) \text{ with } p_{lo} \le p \le p_{up}$$

$$\text{subject to} \frac{dE(x^t, f^t)}{dx} = 0, \forall_t, \text{ and } \max_{t,i} \sigma_v(x_i^t) \le \sigma_{yield}$$

over three sets of design parameters p, constraining simulated centerline nodes $x^t$ to be static equilibria within the von Mises yield surface: (1) to identify places of where to best place templates (see Stage 1 in FIG. 3 and the discussion of identifying sparse template regions below), the local stretch, bending, and twist stiffness is optimized along the initial rest configuration of the wire, adding a sparsity regularizer R to favor the stiffness properties to remain unchanged for most of the model (note, while this first stage does not change the rest configuration of the model, it answers the binary question of where to change $\bar{x}$); (2) to answer the question of which template to use, a generic template (see Stage 2 in FIG. 3 and the discussion below of placing and sizing generic templates) is introduced that captures the behavior of the fabricable templates well, jointly optimizing the continuous parameters of several instances of this template and placed in regions identified with the first stage of the processing/optimization; and (3) in the third stage, the database of fabricable templates is searched for template types and corresponding parameters that closely approximate the optimized instances of the generic templates (see Stage 3 in FIG. 3 and the discussion of replacing generic templates with fabricable templates below). In the third stage, the user selects which templates to use from a set of close matches. Next, the parameters of the chosen templates for spring-like entities are further refined leading to a kinetic wire model that is functional, visually pleasing, and ready for fabrication with a wire bending machine. With bounds $p_{lo}$ and $p_{up}$ on the values of template parameters, it is ensured that the model of the wire mechanism can be fabricated by a wire bending machine. The discretization of the wire model changes at every stage of the design optimization, and the selection matrix S and the attachment points of cables are updated accordingly.

FIG. 3 illustrates process flow 300 during operations of a system of the present description using a computational tool (or a kinetic wire mechanism design tool) to design a kinetic hand and a bending machine using the output of the computational tool to fabricate the kinetic wire mechanism. As shown, the computational tool takes as input 310 a digital file of a skeletal animation providing keyframes that each define a pose (with one pose shown). In the input 310, a kinetic object 312 (here a hand) is shown with its skeleton or rig 314 in a particular pose (such as an initial rest configuration of a wire model along with a set of target poses to strike during animation or movement of the wire model) and with a number of user-specified target locations on the rigging 314.

In the first stage 320, the input 310 is converted into an initial model 321 of the wire mechanism, and material optimization is performed as discussed above including identifying where to place a set of spring-like entities or wire templates, including location or region 322 that is identified by optimizing local stiffness properties (restricting changes to a sparse set of regions). In the second stage 330, the computational model creates an updated model 331 of the wire mechanism with its body now including a set of generic templates at locations/regions identified in the first stage, and this includes generic template or spring-like entity 332. The second stage 330, as discussed above, includes optimizing the continuous parameters of each generic template, including template 332, inserted into the body of the wire mechanism 331.

A template database 340 that includes a set of predefined fabricable spring-like entities 341 with properties matching those of the non-fabricable generic templates, including template 332, is accessed in the process 300. Particularly, in the third stage 350, the computational tool acts to seek best matches between the generic templates (such as template 332) with fabricable spring-like entity-defining templates 341 (such as template 352), and each generic template is replaced with a fabricable template. The third stage 350 may further include refining the parameters of the inserted template, such as template 352. Then, this model 351 is provided as input to a wire bending machine to control its operations to bend input wire into output or a kinetic wire mechanism 360, which includes a plurality of spring-like entities in its wire body including spring-like entity 362 (whose configuration and size as well as location on the wire body is defined by the model 351 and optimized, fabricable template 352).

With regard to the first stage 320 and identifying sparse template regions, the local stiffness properties of respective regions can be essentially changed by replacing regions of the model's rest configuration $\bar{x}$ with fabricable templates of varying shape and size. Motivated by this observation, the computational tool is designed to first identify where along the wire body changes to stiffness properties are necessary, separating them from regions where the wire of the body can remain unchanged. In the second and third stages 330 and 350 (discussed in more detail below), the computational tool replaces identified regions with fabricable templates, approximating the homogenized, non-physical behavior with changes to the rest configuration $\bar{x}$ instead.

Figure 4:
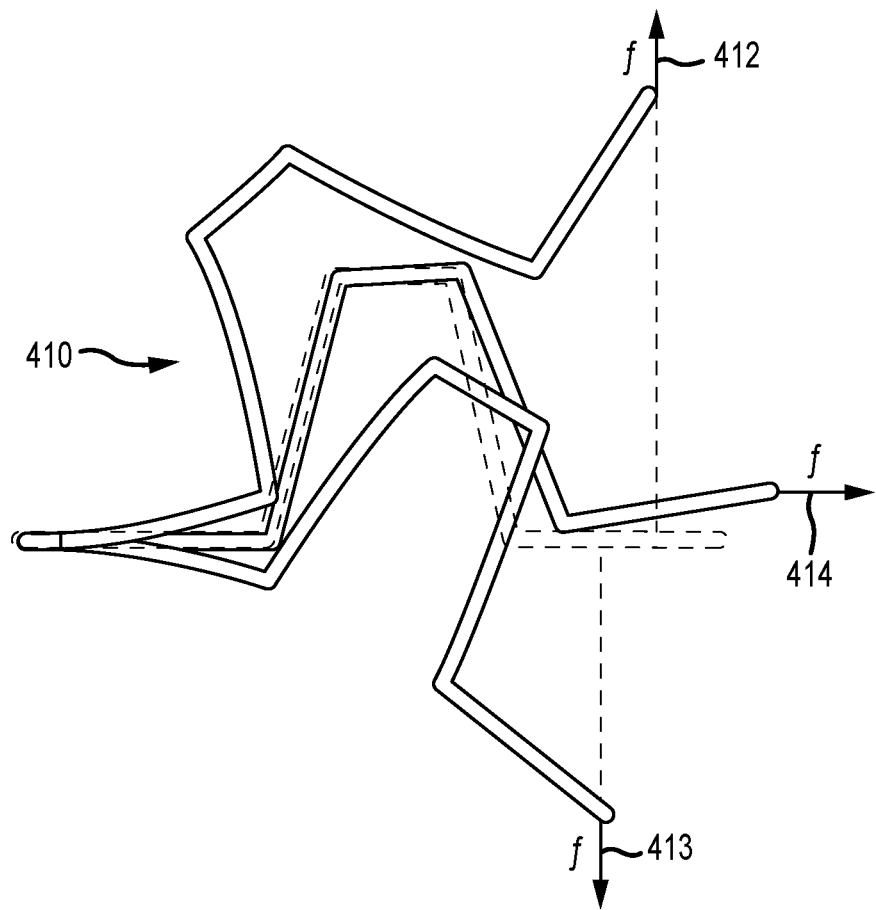
FIG. 4 illustrates an exemplary spring-like entity showing effects of applied forces.

The stiffness properties of wire are uniform and split into stretch $k_s$, bending $k_b$, and twist stiffness $k_t$. For wire with constant, circular cross-section, the bending stiffness is furthermore isotropic. However, when a segment of a straight rod is replaced with an instance of a template and forces are applied to one end while holding the other one fixed (as shown in FIG. 4 for spring-like entity 410), one observes a highly heterogeneous, anisotropic, and force-dependent behavior. If an upward-pointing force 412 is applied (and the same force 413 with opposite sign is applied), one observes an asymmetric deformation. If a force 414 is applied along the direction of the straight rod, one observes bending besides stretching.

Approximating the behavior of a kinetic wire model with an unknown set of templates, the generic problem of the previous equation with stiffness parameters $[k_s, k_b^n, k_b^b, k_t]$ that vary per edge and target collected in the parameter vector p. The bending stiffnesses in the normal n and binormal b directions are decoupled in order to support unrestricted anisotropy. This optimization is bijective to locally estimating separate Young's moduli for stretch and bending, and a shear modulus for twist $[E_s, E_b^n, E_b^b, G_t]$. Replacing a wire segment with a template can only lead to an increase of compliance. To safeguard against local stiffening, the stiffness parameters are bounded to be smaller or equal to the material properties $\hat{p}$ of the wire with constant, circular cross-section. To prevent them from becoming too soft, the stiffness parameters are bounded from below, thus keeping them within the physically-feasible range of fabricable templates:

$$\beta\hat{p} \leq p^{t,i} \leq \hat{p} \text{ with scale factor } \beta<1.$$

With the material optimization, the process continues with answering the binary question of where stiffness changes are necessary. To restrict stiffness changes to a sparse set of regions, deviations from the physical properties $\hat{p}$ are penalized across all targets with an approximate $L_1$-norm:

$$R(p) = w_{sparse} \sum_{i=1}^{n-1} \left( \sum_t \|p^{t,i} - \hat{p}\|^2 \right)^{\frac{1}{\alpha}} \text{ with } \alpha > 2$$

penalizing smaller values more strongly.

The stretch stiffness is an edge-based quantity, while the bending and twist stiffness are node-based quantities. In simulations, stiffness parameters are averaged from neighboring edges to convert them to node-based quantities. If the estimated parameters $p^{t,i}$ deviate from the physical properties $\hat{p}$ by more than a factor of 0.2 for any of the targets t, the respective edge i is labeled for replacement. A key advantage of the material optimization described herein is that these regions can be detected without having to change the rest configuration during minimization.

Figure 5:
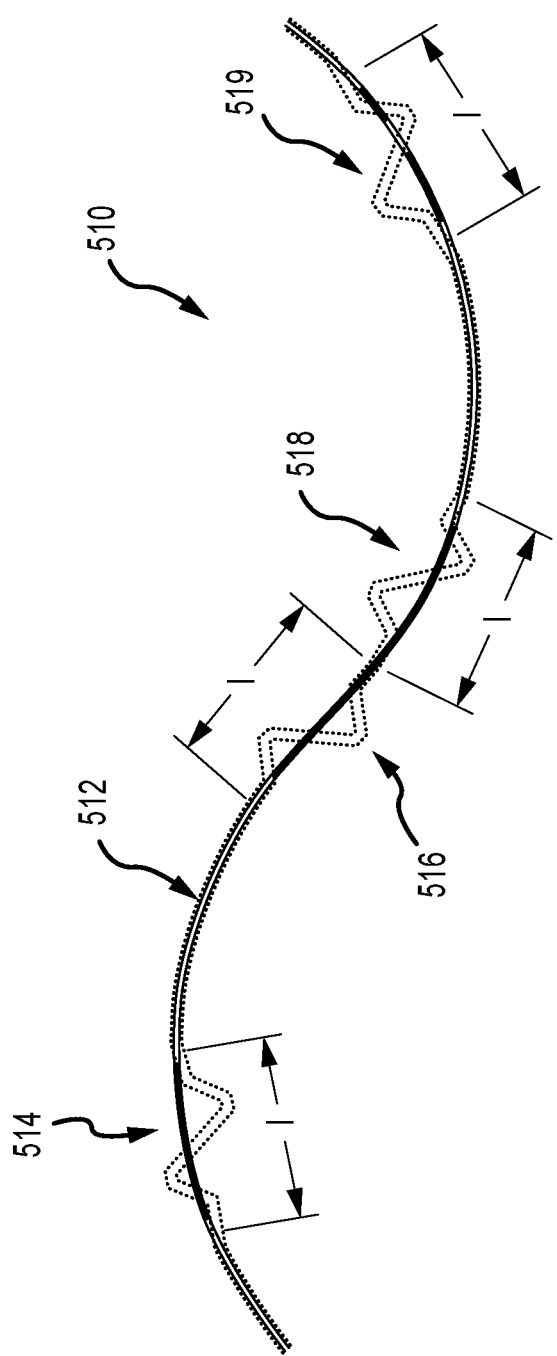
FIG. 5 illustrates a model of a kinetic wire mechanism of the present description showing placement of discrete templates of a particular length in identified regions of the wire body.

With regard to the second stage 330 and placing and sizing generic templates, it should be remembered that an end goal is to locally extend the length of the wire in detected regions, shaping it into fabricable instances of |T| templates in order to match a set of user-specified targets as closely as possible under non-plasticity constraints. Limiting the templates' lengths to a constant length l is nonrestrictive, as multiple templates can be placed in series. Hence, each local region that is labeled for replacement is grown by expanding it equally on either end until the smallest integer number of templates can be fit. FIG. 5 illustrates this process with a kinetic wire mechanism model 510 with a wire body 512, with a one-template case (shown with a single spring-like entity template 514) and a two-template case (shown with a pair of side-by-side or in series spring-like entity templates 516 and 518). If during the expansion there is a cross over to another region, the two are merged and expanded jointly (shown with single spring-like entity template 519). In FIG. 5, l is not measuring arc length but the distance between the two end points, connected with a straight line.

With the material optimization, the exponential design space is significantly reduced by identifying the number m of locations where a template is needed. However, answering the question of which template (or which design for a spring-like entity) to use at a particular location is a formidable task, especially due to the coupling between template type and its parameters. Even if the computational capacity to minimize the design objective over the template parameters of all $m^{|T|}$ configurations was available, the generic design problem is highly non-linear and non-convex. As discussed below with regard to replacing generic templates with fabricable templates, parameter bounds that guarantee fabricability amplify the problem of getting stuck in local minima. Hence, it is important to find a good initial guess before enforcing template-dependent fabricability constraints.

Figure 6:
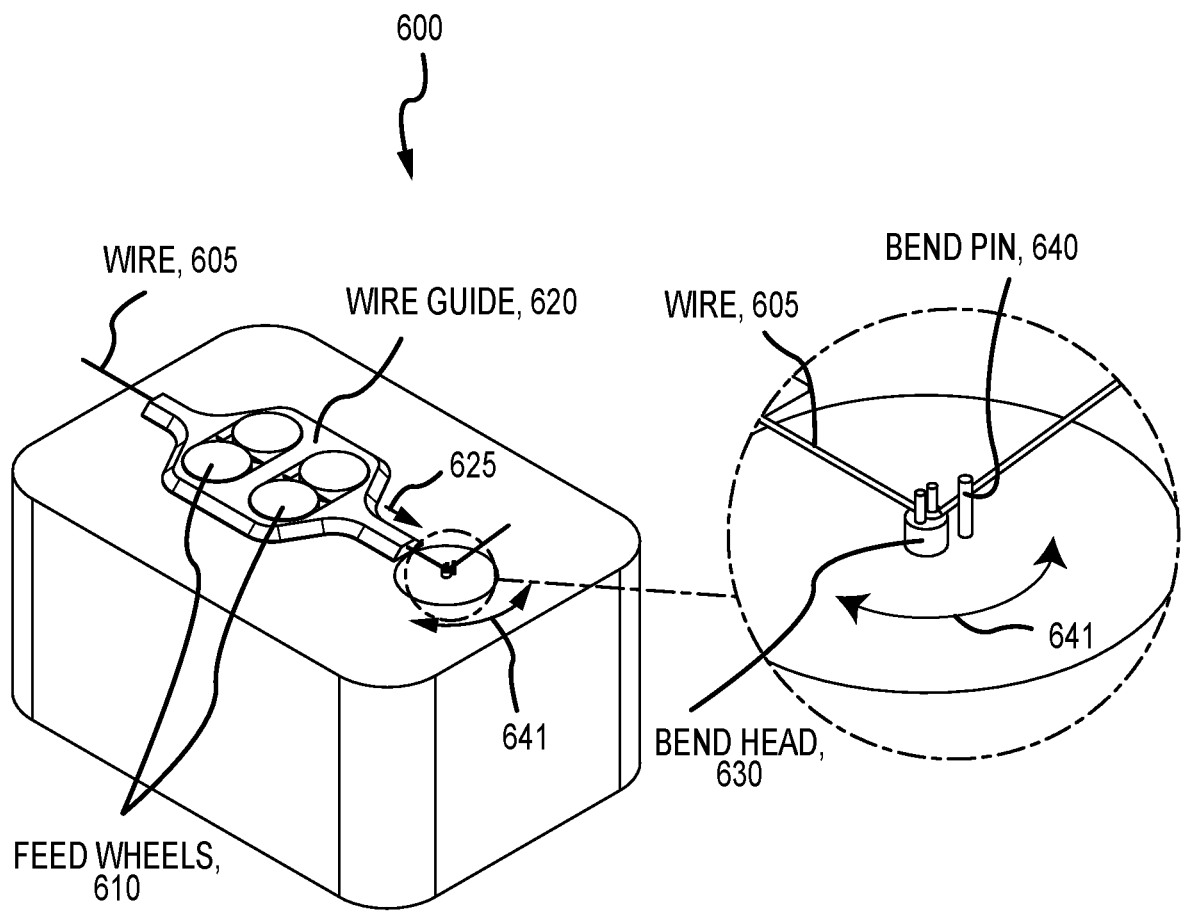
FIG. 6 illustrates a top perspective view and an enlarged partial view of a desktop wire bending machine useful in systems of the present description for fabricating kinetic wire mechanisms.

To avoid a discrete optimization, the computational tool seeks a generic template whose parameters can be varied continuously, smoothly interpolating between desired stiffness properties, which represents the fabricable templates well. However, before discussing the generic template, it may be useful to gain a high-level understanding of desktop CNC bending machines. Desktop benders like the DI Wire Plus or Pro have two degrees of freedom (DOFs) as is illustrated with the bender or bending machine 600 shown in FIG. 6. Wire 605 is fed into a wire guide 620 via its feed wheels 610 prior to being fed to a bend head 630 and bend pin 640. The feed wheels 610 control the extrusion of the wire as shown with arrow 625, and the bend pin 640 is rotated as shown with arrow 641 to bend the wire 605. The bending can be paused and the wire 605 manually rotated, but spatial bends are restricted due to potential collisions between the wire 605 and the machine 600, notably at the scale 1 of the fabricable templates described herein. The bend pin 640 can also be retracted to enable clockwise and counterclockwise bends.

Figure 7:
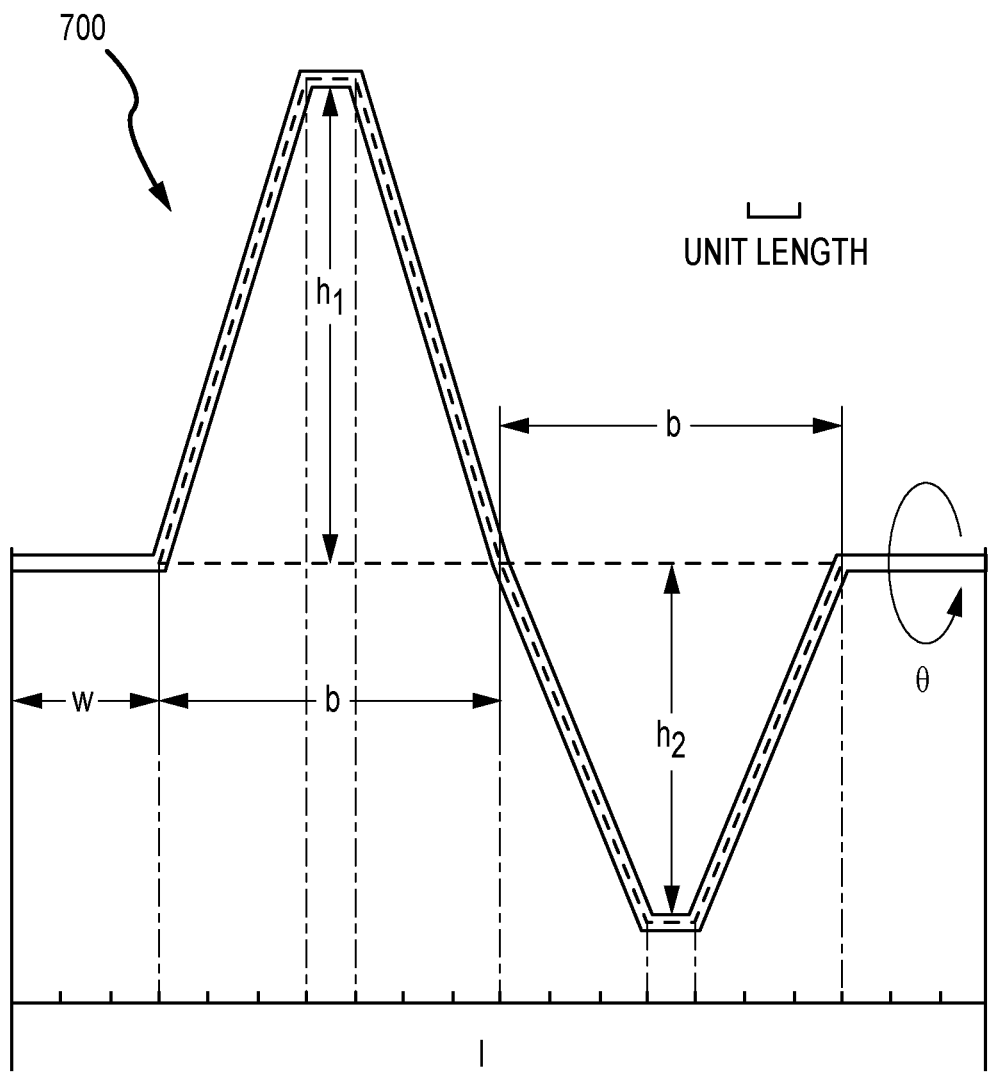
FIG. 7 illustrates an exemplary generic template defining a design of a spring-like entity for initial inclusion in a model of a wire mechanism.
Figure 8:
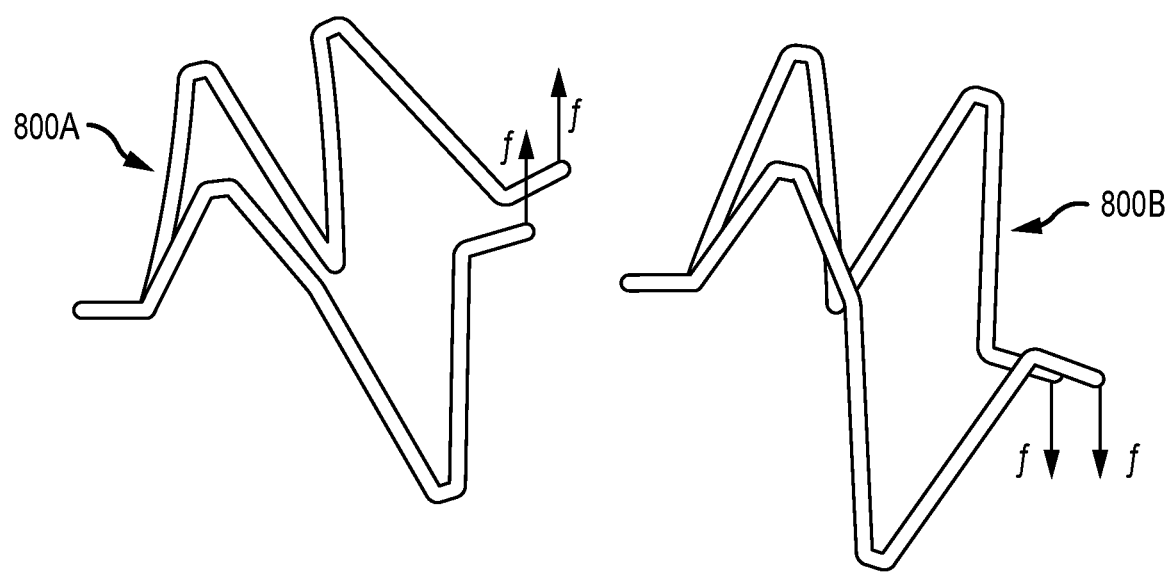
FIG. 8 illustrates a generic template with an asymmetric configuration in two different states in response to applied forces.

FIG. 7 illustrates one useful template 700 defining a design of a generic spring-like entity for initial use in a model of a kinetic wire mechanism. The template 700 is a four-parameter template that fulfills the inventors' desiderata of genericity. Partitioning the line between the two end points in twenty units, two isosceles trapezoids can be defined in the template 700, with constant base b and varying heights $h_1$ and $h_2$. With parameter w, the placement along and with the angle $\theta$ of the rotation about the template's axis can be calibrated. The genericity of the template 700 becomes apparent when the pairs of heights ($h_1$, $h_2$) are varied: if both are zero (0, 0), a straight line of length l is recovered. With a point-symmetric configuration (h, −h), the magnitude of the stiffness along the wire can be controlled. To fine tune the anisotropy of the homogenized bending stiffness, the inventors favor asymmetric configurations, such as the generic template of FIG. 8 shown in first and second states 800A and 800B.

To find optimal parameters [w, $h_1$, $h_2$, $\theta$] for the generic templates (including those shown in FIGS. 7 and 8), the generic design problem discussed above is solved over a 4m-vector p, collecting all template parameters $p_k$. Both are initialized, with the height parameters and rotation angles to zero, and then all templates are centered by setting their offsets w to 3 units $$\left( w = \frac{3}{20} l \right).$$

With the two height parameters, $h_1$ and $h_2$, the stiffness of the template is controlled. To prevent a template from becoming too soft, the maximum allowable height is bound from above and below:

$$[0, -h_{max}, -h_{max}, -\pi] \leq p_k \leq [l-2b, h_{max}, h_{max}, \pi],$$

keeping the offsets and plane rotations within meaningful limits. For demonstrations described herein, the inventors set $h_{max}$ to twice the length l, well representing the stiffness gamut of the fabricable templates.

Figure 9:
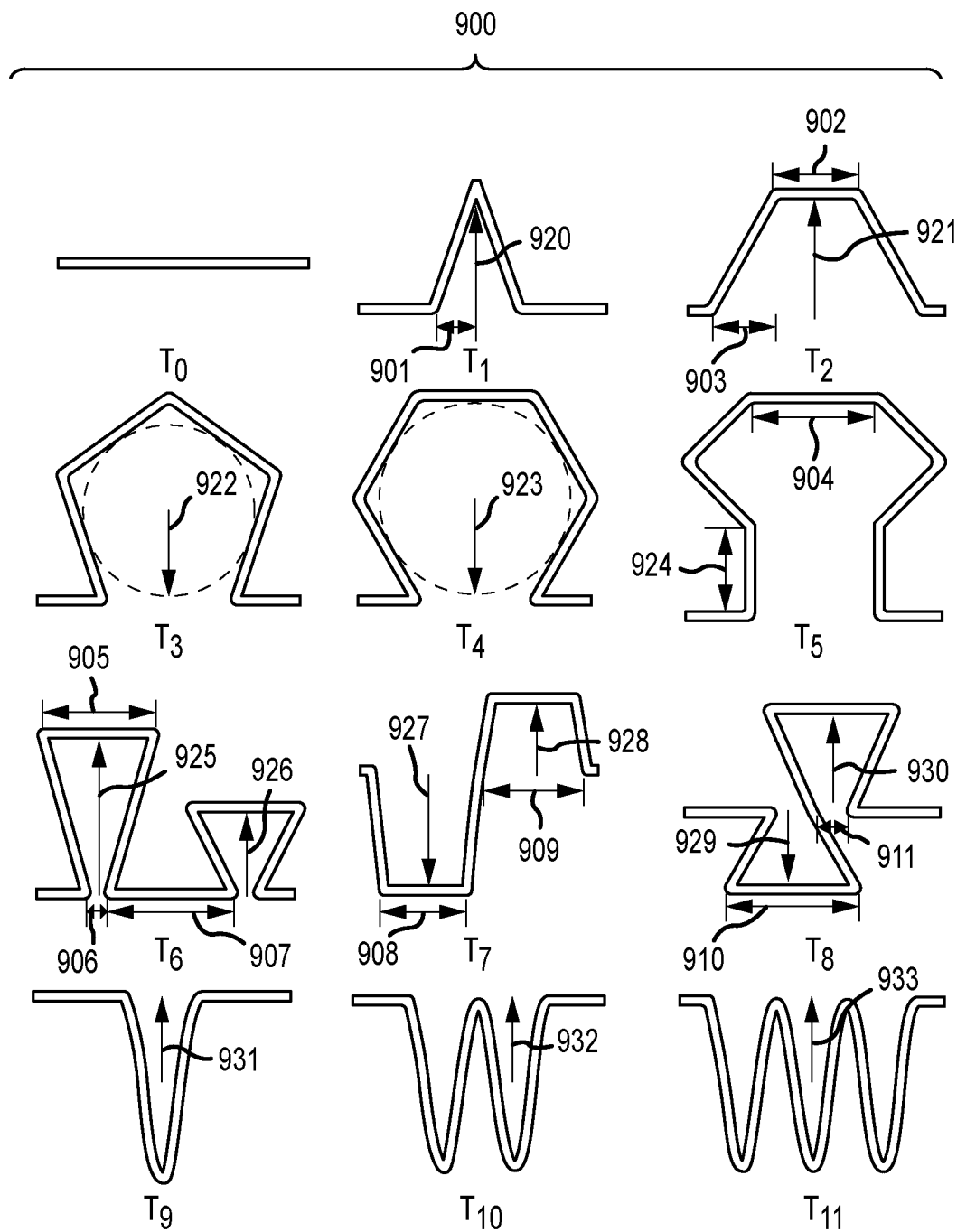
FIG. 9 illustrates an exemplary set of fabricable templates for use in replacing generic templates to generate a model of a kinetic wire mechanism that can be formed with a bending machine.

Now, with regard to replacing generic templates with fabricable templates, it should be understood that, while expressive and well-suited for iterative numerical optimization, the generic wire template is non-fabricable with a wire bending machine. In order to provide the user with fabricable alternatives of varying shape and size, the inventors devised a set of twelve fabricable templates each defining a different spring-like entity for inclusion in a kinetic wire mechanism. FIG. 9 illustrates a set 900 of fabricable templates that may be used to replace the generic templates to provide a model of a kinetic wire mechanism that can readily be fabricated from wire. Besides the straight rod template $T_0$, the set 900 includes polygonal templates $T_1$-$T_5$, which become more compliant with increasing number of sides. The twin templates $T_6$-$T_8$ each includes two isosceles trapezoids and further increase the stiffness gamut. The helical spring templates $T_9$-$T_{11}$ are directly fabricable on an industrial-grade bending machine and are compact and have a distinct visual appearance. Some parameters 901-910 remain fixed for the templates in the set 900 while other parameters 920-933 can be fine-tuned by the computational tool.

Templates $T_0$-$T_8$ are planar and can be fabricated on a bending machine. Helical spring templates $T_9$-$T_{11}$ can be included that can be fabricated in a post-processing step using, for example, an easy-to-make, inexpensive hand tool (discussed below) or an industrial-grade bending machine. Besides collisions, two device-dependent and wire-dependent parameters delimit the fabricability of the template designs in the set 900 of FIG. 9: the maximum bending angle $\alpha_{max}$ and the minimum length of a straight segment $d_{min}$. Taking these considerations into account, the inventors represent the no-template case explicitly with template $T_0$, supporting polygonal templates with increasing number of sides: isosceles triangles $T_1$ and trapezoids $T_2$, regular pentagons $T_3$ and hexagons $T_4$, and an irregular hexagon $T_5$ with two additional edges to vary the distance to the template's axis. The twin templates $T_6$-$T_8$ are each made up of two isosceles trapezoids, resembling the generic template: for $T_6$, an additional edge was added between the two trapezoids, avoiding collisions if both trapezoids end up on the same side.

In the set 900, the height parameters are allowed to change signs for template $T_6$, but the height parameters are constrained to remain on opposite sides for templates $T_7$ and $T_8$, thereby avoiding an infeasible bending angle at the node connecting the two trapezoids for template $T_7$ or collisions for template $T_8$, respectively. All the templates in the set 900 of FIG. 9 are allowed by the computational tool to rotate about their axis. Hence, the configurations for templates $T_7$ and $T_8$ can be mirrored, constraining the height parameters to remain positive. In spite of templates $T_7$ and $T_8$ having the same edge count, one can distinguish between the two due to their distinct visual appearance and behavior (see discussion below). The set 900 includes helical springs with constant pitch and one, two, or three coils with templates $T_9$-$T_{11}$, parameterizing the coiling radius, which can be bent on an industrial-grade machine.

Figure 10:
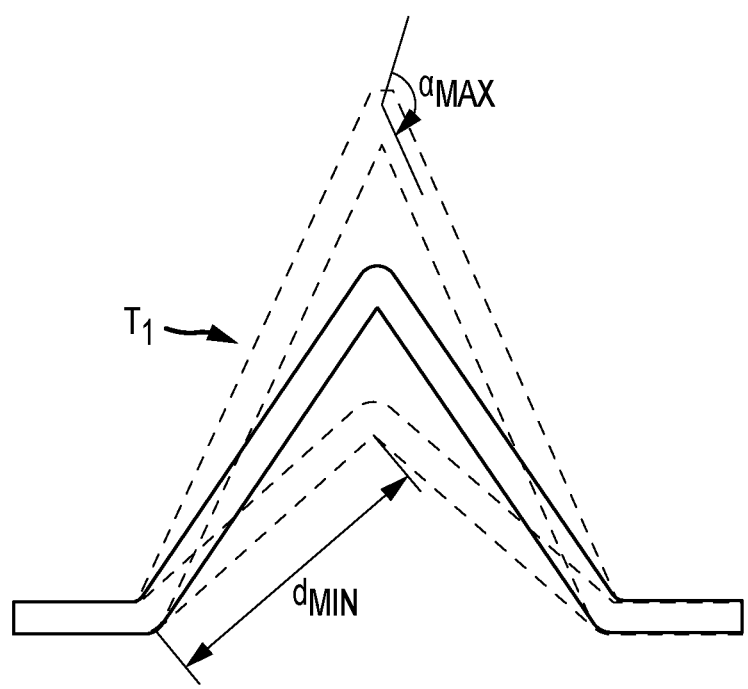
FIG. 10 shows an enlarged view of one of the fabricable templates of the set shown in FIG. 9 showing its maximum bending angle and minimum edge length constraints.

As aforementioned, all the fabricable templates in the template set 900 have constant overall length l. In addition to the parameters that allow adjustments to the lengths of a template's edges (arrows 901-910 in FIG. 9) and the angles between them (arrows 920-933 in FIG. 9), the spatial orientation of the templates in the set 900 can be varied by the computational tool with a rotation parameter θ, calibrating their placement within length l with an offset parameter w. The fabrication constraints bound the parameter values, both from above and from below. As shown for a portion template $T_1$ shown in detail in FIG. 10, the maximum bending angle $\alpha_{max}$ and minimum edge length $d_{min}$ constrain this feasible range, motivating the inclusion of template $T_0$ shown in FIG. 9 and templates with increasing number of sides to give a wider fabricable stiffness gamut.

The computational tool acts to select one or more of the fabricable templates in the set 900 of FIG. 9 to replace a generic template of a model of a kinetic wire mechanism.

The output of the second stage 330 of the design and fabrication method 300 (or of design optimization) of FIG. 3 is parameter values $p_G$ for m instances of the generic template $T_G$. For each instance, the computational tool seeks to find a fabricable template $T_I$ along with corresponding parameter values $p_I$, such that the deformation behavior of the optimized generic instance is preserved.

To compare the behavior of a generic to a fabricable template, the rest configurations $\bar{x}(p_G)$ and $\bar{x}(p_I)$ are initialized, and forces $f_j$ are applied to either end, keeping the other end fixed, which results in deformed configurations $x(p_G, f_j)$ and $x(p_I, f_j)$. Selecting the deformed end nodes to which to apply the forces to with selection matrices S_G and S_I, the root-mean-square (RMS) error of the differences between deformed end nodes is computed, relative to the deformations of the ends of the generic instance:

$$s(p_G, p_I) = \sqrt{\frac{1}{|F|} \sum_{j=1}^{|F|} \left( \frac{\|S_{G,j} x(p_G, f_j) - S_{I,j} x(p_I, f_j)\|}{\|S_{G,j} x(p_G, f_j) - S_{G,j} \bar{x}(p_G)\|} \right)^2}$$

with small values of the similarity metric indicating a matching behavior. The RMS error means that larger deviations are penalized more. The same $$\frac{|F|}{2}$$

in-plane and out-of-plane forces are applied to either end, comparing the spatial behavior of the templates. Experimenting with various sizes of uniformly distributed forces, the inventors found that a total of |F|=20 forces are sufficient. Note that the similarity metric is asymmetric, reflecting the goal of an unidirectional replacement of a generic template with a fabricable template.

To efficiently replace a generic $p_G$ with a fabricable instance $p_I$, a template database (containing definitions and parameters of the templates in set 900 of FIG. 9) is pre-built and stored in memory accessible by the computational tool. The template database is built by sampling parameters and storing their pairwise similarity scores $s(p_G, p_I)$ for fast retrieval. Specifically, template parameters are sampled within their feasible range, with the exception of the rotation parameter θ, which is constrained to the two planar configurations θ=0 and θ=π. For the generic template $T_G$ and the fabricable template $T_6$, the two height parameters can be positive or negative, so that sampling can be restricted to θ=0 to avoid redundancy. For template $T_0$, the parameter θ can be omitted due to isotropy. After sampling, all instances of the generic templates (2, 187 samples) and fabricable templates (651 samples) were simulated, applying the same |F| forces and computing their pairwise scores. Database construction only took about 10 minutes and only needs to be constructed once per wire-device pair.

Then, to retrieve function-preserving fabricable instances or templates given an optimized generic template $p_G$=[w, $h_1$, $h_2$, θ], the computational tool identifies the K nearest generic samples $p_G$ with distances $d_k$, setting θ to zero. For each nearest neighbor, the computational tool retrieves scores for the fabricable samples $p_I$ and computes their weighted average:

$$s(p_G, p_I) \approx \sum_{k=1}^{K} w_k s(p_G^k, p_I) \text{ with weights } w_k = \frac{\sum_j d_j - d_k}{(K-1)\sum_j d_j}$$

approximating the score for optimized values $p_G$. Sorting them in ascending order, the computational tool (or design method provided by this tool) presents the L best matches to the user, and the user can then choose the aesthetically and functionally most pleasing fabricable instance/template $p_I$. To account for spatial rotations $\theta \neq 0$ in the optimized parameters $p_G$, the design process may involve offsetting the retrieved rotation in $p_I$ accordingly. For all the demonstrations/prototyping, the inventors used K=2 and L=6.

Figure 11:
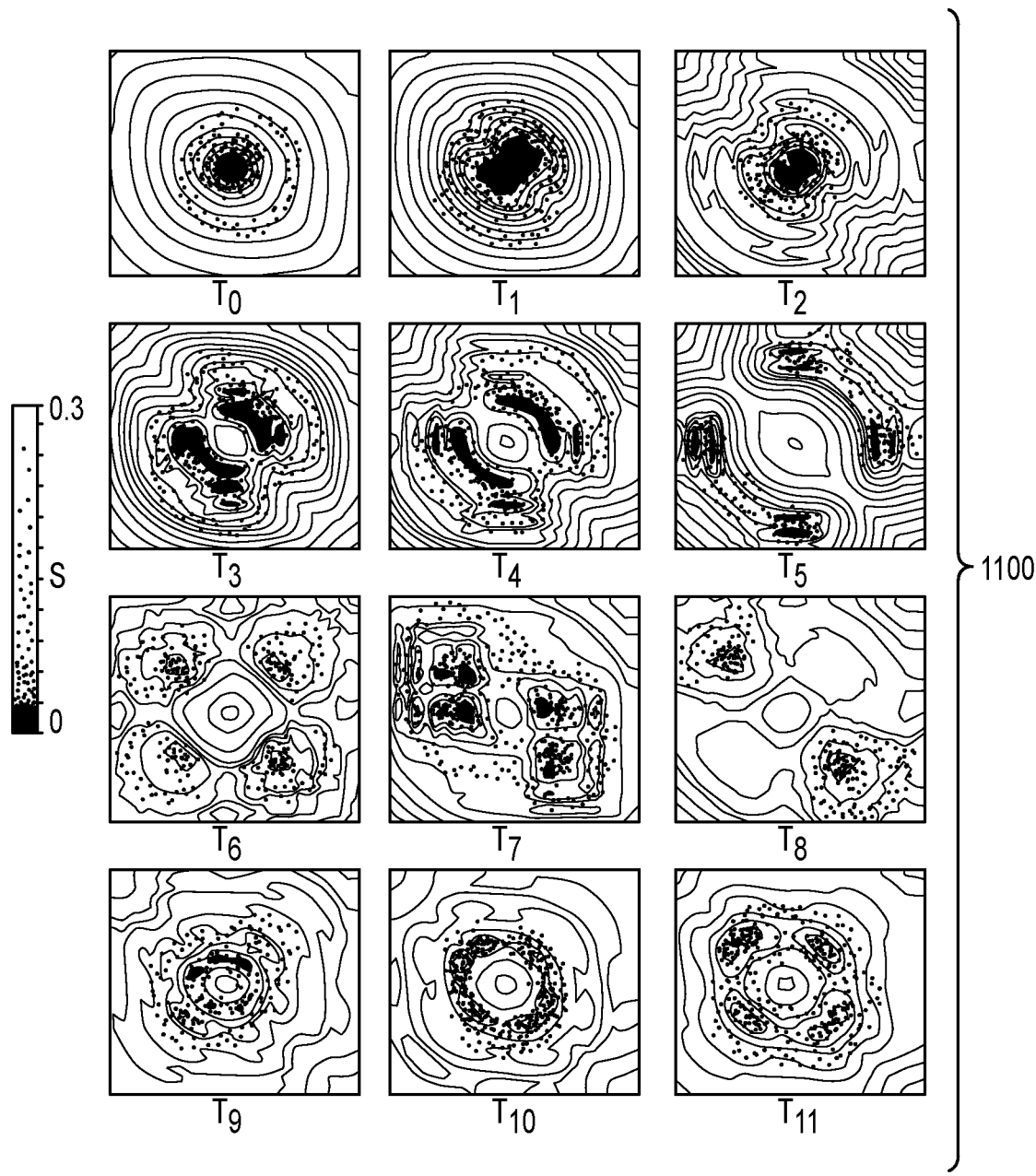
FIG. 11 illustrates a set of plots comparing the similarity of generic templates to the set of fabricable templates of FIG. 9.

FIG. 11 illustrates a set 1100 of plots comparing the similarity s of generic to the set 900 of fabricable templates of FIG. 9 for varying height parameters. From the plot set 1100, it can be observed that polygonal templates ($T_1$-$T_5$) well-approximate a concentrically increasing compliant behavior for small to medium height values. Twin templates well-capture highly compliant symmetric (template $T_6$) and asymmetric (templates $T_6$-$T_8$) behavior, corresponding to large height values. While functionally overlapping with templates $T_0$-$T_8$, the helical spring templates $T_9$-$T_{11}$ have a small volumetric footprint for their stiffness range.

Varying the height parameters ($h_1$, $h_2$) of the generic template in their allowable range $[-h_{max}, h_{max}]$, the contours can be plotted as shown in plot 1200 in FIG. 12. Specifically, the contours of the minimum score across all types of templates $T_1$ and corresponding parameter samples $p_I$ (see plot 1200), restricting the minimum to samples drawn from a particular template type (shown in set 1100 of FIG. 11). As can be seen from plot 1200, the computational tool will always be able to find a fabricable instance with a similar spatial behavior for all combinations of heights. From the set 1100 of plots in FIG. 11, one can see that the polygonal templates with fewer sides (templates $T_1$ and $T_2$) well-approximate the behavior for small height values, while templates with larger side counts (templates $T_3$-$T_5$) capture the behavior for medium values. The twin fabricable templates ($T_6$-$T_8$) are well-suited to approximate symmetric ($T_6$) and asymmetric (templates $T_6$-$T_8$) configurations with large height values. While the functional behavior of the helical templates (template $T_9$-$T_{11}$) is well captured by planar templates ($T_0$-$T_8$), they have a significantly smaller volumetric footprint and are visually distinct and pleasing so that a user may wish to use these to replace the generic instance. Overall, the template database (which includes the set 900 of FIG. 9) contains sufficient behavioral redundancy to provide the user with fabricable options of varying volume and appearance.

Figure 13:
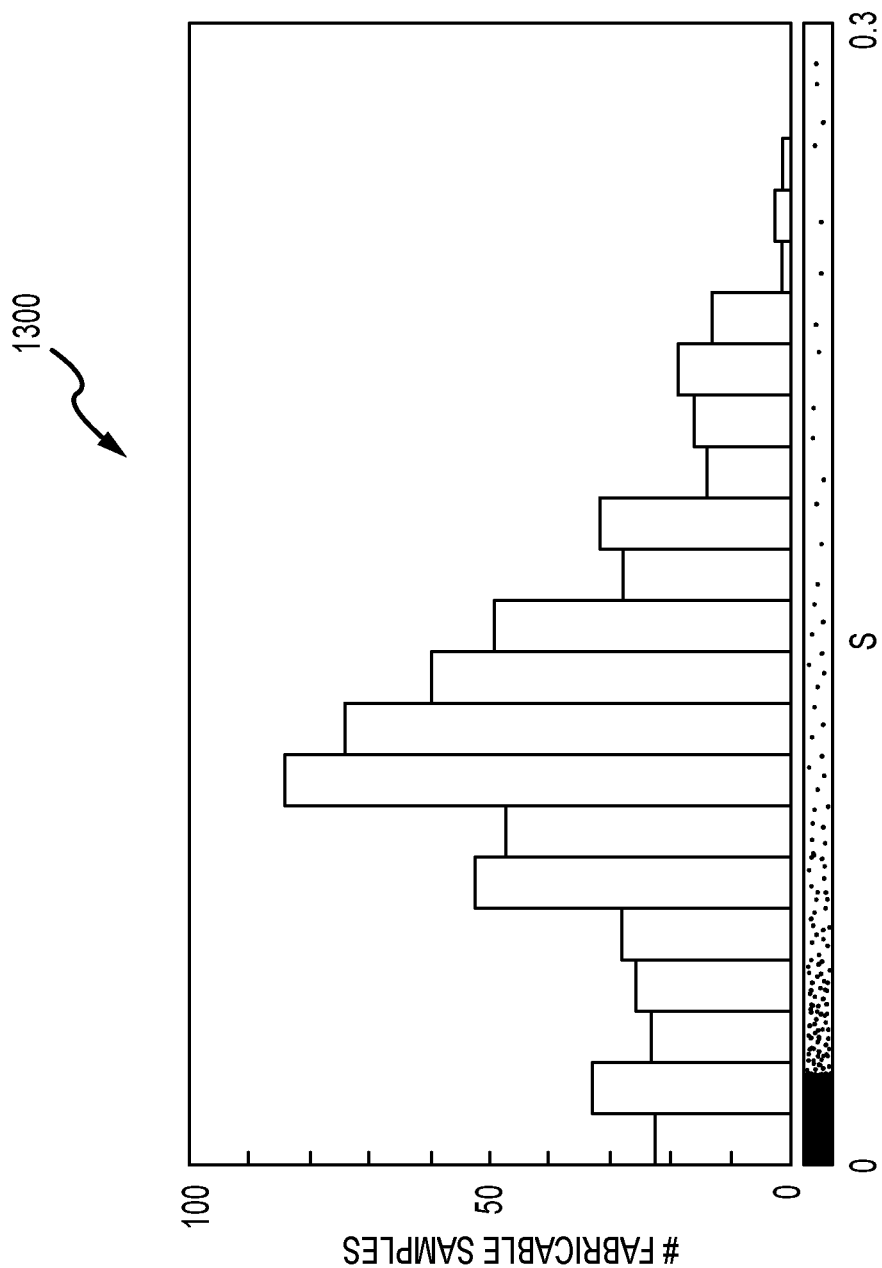
FIG. 13 is a histogram of approximation error for all fabricable samples.

FIG. 13 provides a histogram 1300 of the approximation error for all fabricable samples. As can be seen, the generic template approximates the spatial behavior of the fabricable templates well, with the approximation error for the majority of the fabricable template samples being below the 0.2 mark. Turning now to refining fabricable templates, after the behavior-preserving replacement of the m generic templates in the model are performed, the computational tool has produced a fabrication-ready model of a wire mechanism that matches the targets well. To fine-tune the fabricable templates, all the parameters shown with arrows 920-933 for the templates of set 900 are collected in a parameter vector p, and the computation tool solves a third instance of the design optimization equation (see above) under strict fabricability constraints. The parameters shown with arrows 901-911 for the templates of set 900, rotations θ, and offsets w remain fixed. Note that the fabrication constraints partition the design space into discontinuous regions. However, with an initial guess set to the parameter values retrieved from the template database, the computational tool can quadratically converge to a minimum with small target matching error.

With regard to numerical optimization, besides the design parameters p, the computational tool may act to optimize cable forces f. Cables can only be pulled on, and, thus, the magnitudes of the cable forces are restricted to non-negative values, optionally bounding them from above. While the cables' attachment points on the wire body are fixed, the location of pulley positions can be optimized, restricting them to user-defined regions in global coordinates.

The static equilibria of the design problem is implicitly enforced, relying on the implicit function theorem to compute the objective gradient:

$$\frac{df(y^t, x^t(y^t))}{dy} = \frac{\partial f(y^t, x^t)}{\partial y} + \frac{\partial f(y, x^t)}{\partial x} \frac{dx^t(y^t)}{dy}$$

$$\frac{dx^t(y^t)}{dy} = -\left(\frac{\partial^2 E(y^t, x^t)}{\partial^2 x}\right)^{-1} \frac{\partial^2 E(y^t, x^t)}{\partial x \partial y}$$

where the design parameters p and cable force $f^t$ are collected for target t in a vector $y^t$. Formulating an adjoint system, the gradient is computed by solving a single sparse system. Note that the torsional strain $\varepsilon_r$ remains zero for a circular wire. Stretch along the wire is further insignificant and $\varepsilon_s$=0. The constraints on the yield strength thus simplify significantly, considering stresses caused by bending strain $\varepsilon_b$ only. For minimization, one can use a standard interior point method and BFGS (see, for example, that presented by Nocedal and Wright in 2006).

Turning now to fabrication with the output of the computational tool, the kinetic wire mechanisms or characters may be bent from metal wire such as spring steel (e.g., 1 mm diameter) using a wire bending machine (such as a DI Wire Pro desktop CNC wire bender or the like). To ensure consecutive bends are coplanar, the inventors added additional plates around the bend head that constrain the wire from below and above. The inventors also added a guide that prevents the wire from popping out of the bend head during complex close bends.

For a wire shape to be fabricable, it is desirable to avoid collisions during the fabrication. The inventors during testing observed that as the wire is compliant, non-local collisions and wire-wire collisions are typically not an issue as collisions result in small elastic deformations of the wire. Therefore, the inventors limited their concern to local collisions, namely of the wire with the wire guide (see guide 620 in FIG. 6). For the inventors' testing/prototyping setup, this means that the maximum bending angle $\alpha_{max}$ is 120 degrees. A further fabrication constraint was that the inventors' required a minimum feed length $d_{min}$ between consecutive bends (given by the distance between the bend head 630 and bend pin 640 in the machine 600 of FIG. 6), which in the particular test case and machine 600 was 7 mm. These constraints can readily be taken into account in the fabricable template database, so all templates in the database can be fabricated. If the input rig has angles that are larger than $\alpha_{max}$, corners can be rounded off by introducing segments of length $d_{min}$ in a pre-preprocessing step.

During prototyping, the inventors observed that during the first few deformations of the parts that the bends would relax and bend angles would decrease by a few degrees. This was likely due to relaxation of the internal stresses in the wire. To account for this effect, the bending machine was calibrated so that the desired angle is reached after stresses have been relaxed. After fabrication, the bends were manually agitated to induce this relaxation. For improved accuracy, the parts were compared to reference drawings and small manual corrections were made where and when beneficial.

Although the DI Wire Pro bending machine supports the fabrication of continuous bends by simultaneously bending and extruding, this would greatly increase the complexity of calibrating the machine and, thereby, also the fabrication error. Therefore, the inventors operated/controlled the bending machine to provide discrete bends and piecewise-linear shapes with a segment length of $d_{min}$. The DI Wire Pro bending machine is aimed at fabricating 2D planar wire shapes. The inventors created 3D wire shapes by: (1) sequentially connecting multiple 2D wire shapes, controlling the rotation angle between wires; (2) pausing the machine and rotating the wire (or this may be done automatically with an industrial-grade CNC bending machine or the like); or (3) manually adding out-of-plane bends as a post-process. In each case, jigs may be used to ensure the accuracy of the parts.

Figure 14:
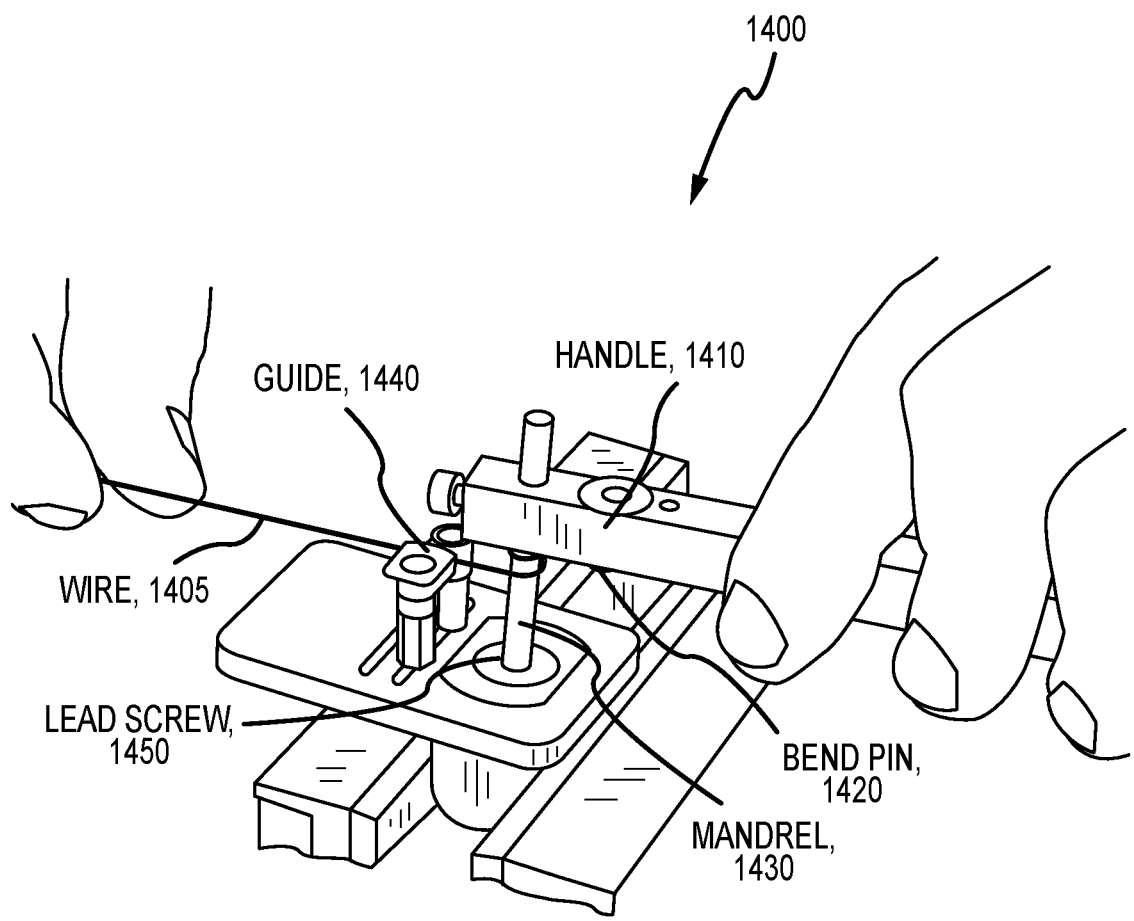
FIG. 14 is a top perspective view of a manual bending tool during its use to provide helical spring-type entities in a kinetic wire mechanism.

To increase the stiffness gamut, the template database includes three coil springs ($T_9$-$T_{11}$). These can be added in a manual post-process (after bending by the bending machine) using a simple custom hand tool or with an industrial-grade CNC bending machine or the like. An exemplary coil fabrication tool 1400 is shown in FIG. 14 receiving input wire 1405 that typically has been processed by a bending machine, and the inventors used this tool to form coils in a few seconds. The tool 1400 includes a handle 1410, a bend pin 1420, a mandrel 1430, a guide 1440, and a lead screw 1450.

As shown in use, coils can be formed in wire 1405 that is fed through guide 1440 that correspond with the spring-like fabricable templates. The size of the mandrel 1430 can be changed to allow for coils with varying radii. The coil pitch is determined by the pitch of the lead screw 1450. During its use, a length of wire 1405 that is required for the coil is added, so that after the coil is added the part has the correct dimensions. The tool 1400 works by wrapping the wire 1405 around a mandrel 1430, which is mounted on a lead screw 1450, and the coil radius is varied by changing the radius of the mandrel 1430. After bending, the individual wires 1405 are assembled, such as by using crimping connectors or the like.

The inventors tested the design and fabrication method (and corresponding system) by designing and fabricating three kinetic wire mechanisms with three differing designs (e.g., differing target locations and target poses defined by differing rigs and keyframe inputs). For each of these test cases, the inventors used $\sigma_{yield}=1.6$ GPa as the yield strength of the metal wire (e.g., steel wire). For the material optimization, the stiffness scale was bound over $\beta=10^{-4}$, and the sparsity regularizer was set at $\alpha=4$. For both the generic and fabricable templates, the size was fixed at $l=20$ mm, and the height bound for the generic template was set at $h_{max}=40$ mm.

Figure 15:
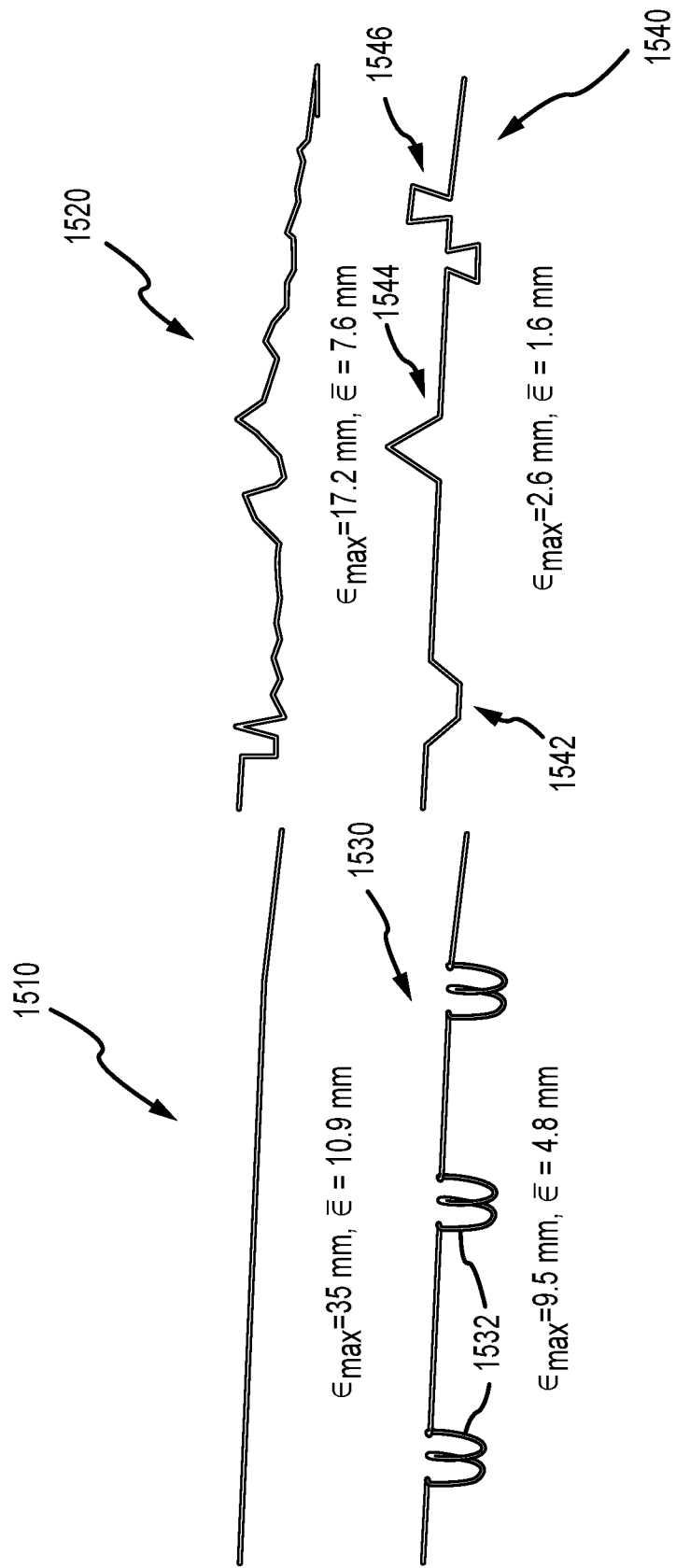
FIG. 15 illustrates four different designs for a kinetic wire mechanism in the form of a human ring finger.

To demonstrate the performance of the design and fabrication approach, an optimized finger can be compared to a set of alternative approaches as shown in FIG. 15 for a human ring finger. The figure shows the mean error $\bar{\epsilon}$ and the max error $\epsilon_{max}$, computed across all poses and targets. In all the cases, a single cable force and pulley position are optimized. The design and fabrication approach satisfies fabrication constraints and has significantly improved tracking performance.

FIG. 15 illustrates four different ring finger designs 1510, 1520, 1530, and 1540 for a finger based on input (i.e., skeletal animation) of a bending human ring finger. Model/design 1510 is a piecewise linear design with the finger's wire body following the shape of the input mesh, and it was force optimized with strain-limiting constraint to prevent plastic deformation. Model/design 1520 was the result of a direct shape optimization. Here, the inventors directly optimized the individual node locations along the rod-shape wire body. However, due to the ill-posed design space, the resulting shape matches the targets poorly for wire structures formed using the design/model 1520 and does not satisfy fabrication constraints. In model/design 1530, the wire body includes coils at the joints. Templates (defining the coils) were naively placed it the rig joints (e.g., template $T_{10}$, radius 6 mm), and the actuation force was optimized. Model/design 1540 was generated using the design method implemented using the computational tool and design method taught herein. The wire body includes three templates 1542, 1544, and 1546 defining three different spring-like entities (at locations associated with the finger joints). The model/design 1540 matches the targets best, does not undergo plastic deformation, and satisfies fabrication constraints.

Figure 16:
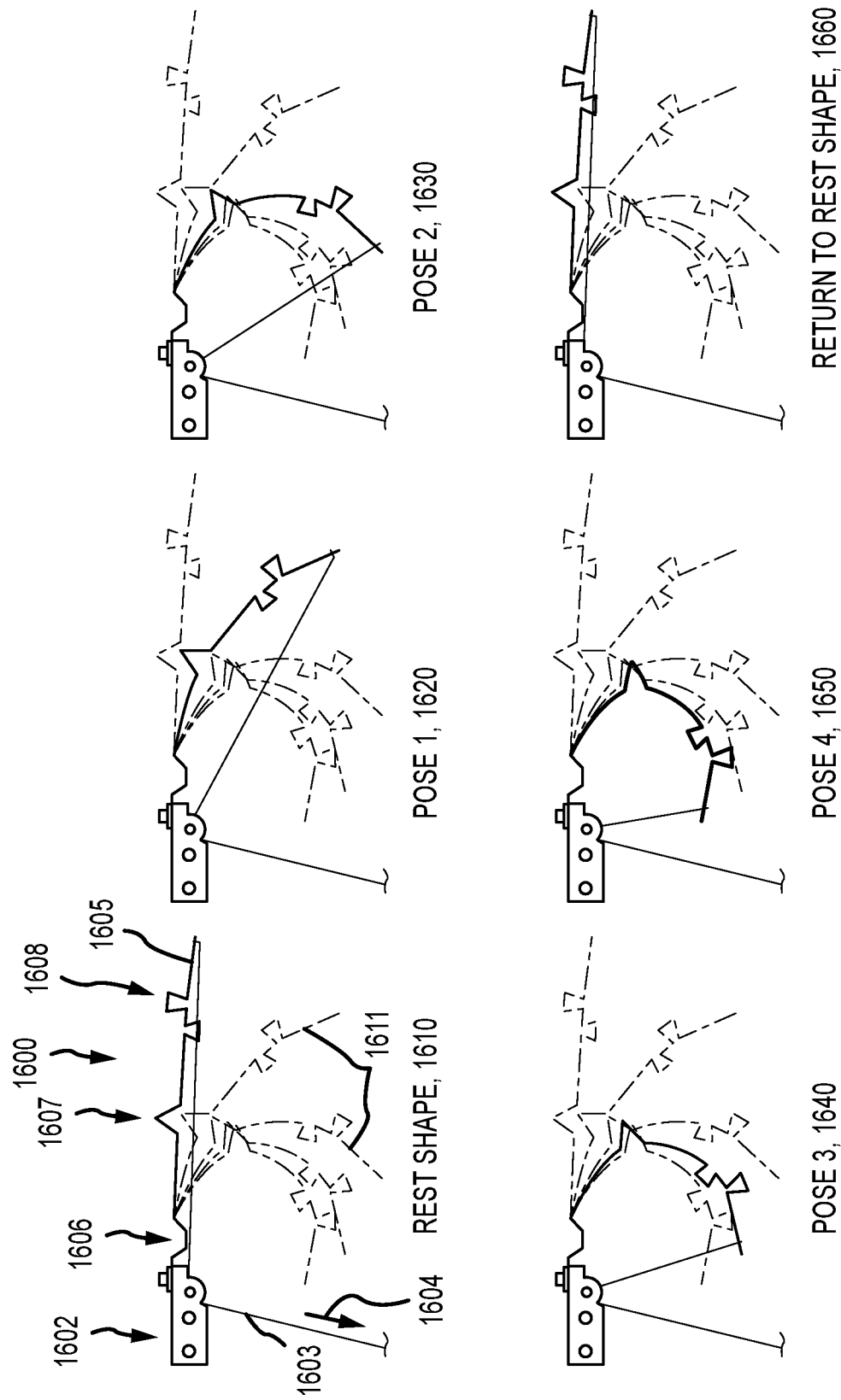
FIG. 16 illustrates a comparison of actual movement of a fabricated kinetic wire mechanism in the form of a bending finger with simulated results with the model used to fabricate the kinetic wire mechanism.

To validate the design and fabrication pipeline/method (and corresponding system), the inventors compared the simulated and fabricated results for a finger. FIG. 16 illustrates a kinetic wire mechanism 1600 that includes a base or support 1602 to which a wire body 1605 is attached at one end and that includes a pulley(s) over which a cable 1603 is run is positioned. The cable 1603 is attached to the outward or opposite end of the wire body 1605 and can be pulled as shown with arrow 1604 to actuate or drive movement of the mechanism 1600. The wire body 1605 is formed using a bending machine that is operated to bend the wire body 1605 based on the model/design 1540 of FIG. 15 (which is the output of a computational tool of the present description). As such, it includes the three different spring-like entities 1606, 1607, and 1608. In FIG. 16, the mechanism 1600 is shown to overlay drawings showing simulated movement or poses of the model/design used to form the mechanism 1600. During testing/validation, the cable 1603 was pulled 1604 to move the wire body 1605 from its rest shape (shown at operating state 1610) through four poses (shown at operating states 1620, 1630, 1640, and 1650), at which point the force 1604 on the cable 1603 was released to allow the mechanism 1600 to return to its rest shape (shown at operating state 1660).

FIG. 16 shows a fabricated wire mechanism 1600 simulating a ring finger (from the hand example below) and overlaid on the finger shape 1611 in the rest pose 1610 and 1660 and four target poses 1620, 1630, 1640, and 1650 as predicted by the simulation. In the hand example, the ring finger provided by mechanism 1600 has the largest stress among the fingers in the extreme poses (e.g., the fourth pose associated with operating state 1650). As can be seen in FIG. 16, there is a close match between the simulated and fabricated results (e.g., when the mechanism 1600 is pulled with the cable forces, it can closely match the simulation trajectory, even for large deformations (and no plastic deformation is observed after the large deformation). It can be seen that there is some error in the rest shape of the finger mechanism 1600, which is introduced due to inaccuracies in the fabrication process (most likely due to the stress relaxation), and this explains the small deviations that are seen in the four target poses 1620, 1630, 1640, and 1650 of the kinetic wire mechanism 1600.

Figure 17:
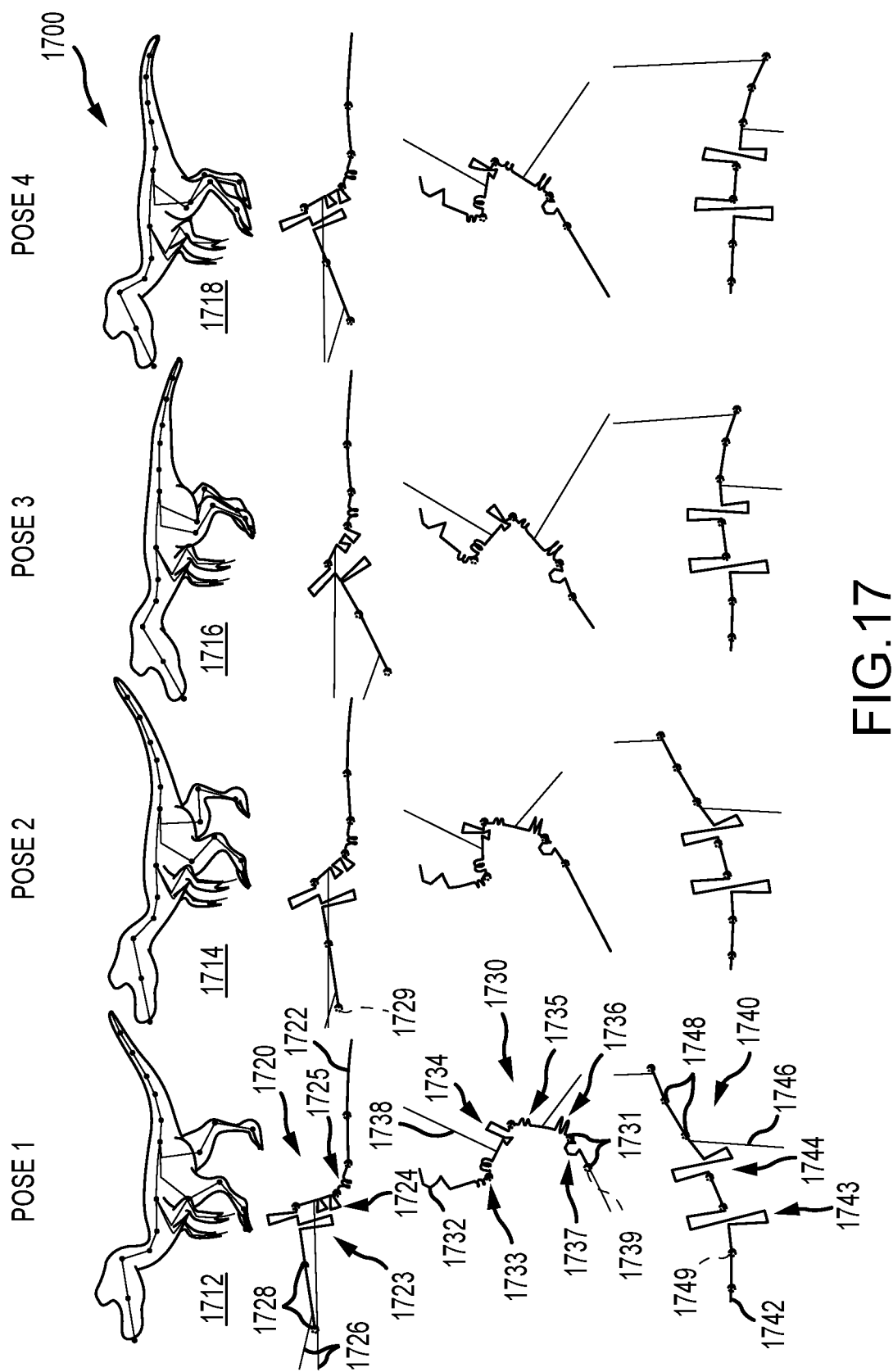
FIG. 17 illustrates a design and performance tracking process for a kinetic wire mechanism created to provide a walking dinosaur.

FIG. 17 illustrates a design and performance tracking process 1700 across four input poses. The input 1710 to the design process includes keyframes 1712, 1714, 1716, and 1718 of a dinosaur defined with conventional skeletal animation or rigging. A kinetic wire mechanism is then designed and fabricated with a bending machine from the input 1710, with its neck 1720, leg 1730, and tail 1740 shown as being formed separately and then later connected/coupled together. The neck 1720 includes a wire body 1722 that can be actuated by cables 1726, and the wire body 1722 includes three differing spring-like entities 1723, 1724, and 1725 to allow the fabricated neck (wire mechanism) to have a set/number of targets 1728 move as similar user-selected marker points in the rigs 1729 move to strike the four poses.

Similarly, the front leg 1730 includes a wire body 1732 that can be actuated by cables 1738, and the wire body includes spring-like entities 1733, 1734, 1735, 1736, and 1737 such that when actuated its target positions/targets 1731 can match movement of corresponding user-selected marker points in the front leg rigging in the input 1710. The tail 1740 includes a wire body 1742 that is actuated by cables 1746, and the tail 1740 includes spring-like entities 1743 and 1744 such that it can have its target points 1748 match locations and movements of marker points 1749 through the four poses. The processes 1700 provide a walking dinosaur with an optimized wire structure (made up of sub-structures 1720, 1730, and 1740) with optimized cable forces to provide the animation or movement of the input 1710. The first row 1710 shows the four target poses 1712, 1714, 1716, and 1718 from the input rigged animation (including the input skeleton) 1710. The second, third, and fourth rows show the tracked performance on the dinosaur neck 1720, the left leg 1730, and the tail 1740, respectively.

The design process starts from a rigged dinosaur character in input 1710 with a full walking cycle provided via the poses defined in the four keyframes 1712-1718. The kinetic wire mechanism design method (as implemented with the computational tool discussed herein) designs a model for a wire structure/mechanism that is then built using this model as input for a wire bending machine. In practice, a full wire structure of the dinosaur character (60 cm by 20 cm by 7 cm) was designed and fabricated, and this wire structure/mechanism was actuated with ten cables. Its motion closely resembled the walking motion from the digital input. In this test design, the dinosaur body was fixed in global coordinates, and the neck, tail, and legs were rigidly connected to the body. The initial wire structure was created from the skeleton of the dinosaur, which is a piecewise linear structure bent at the rig joints.

Figure 18:
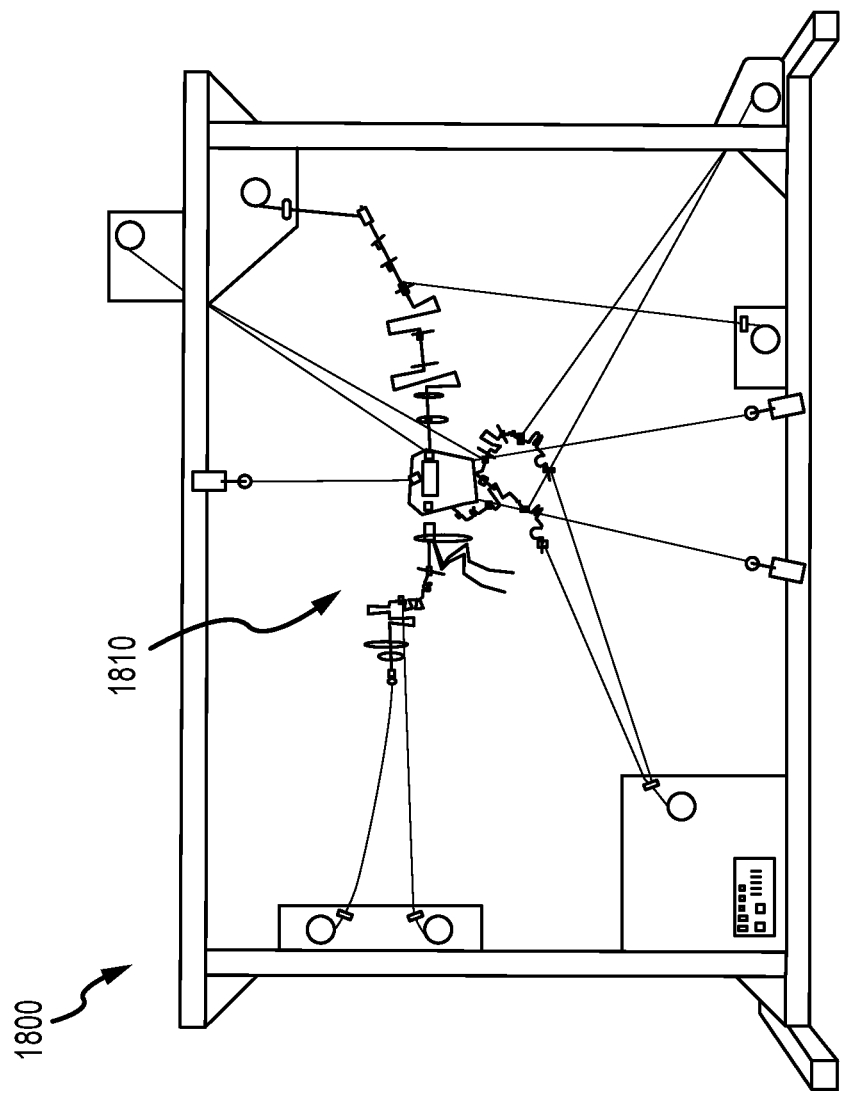
FIG. 18 illustrates a side view of a walking dinosaur system including a kinetic wire mechanism designed and fabricated according to the design and fabrication method(s) described herein.

Optimization was performed both on the wire structure at the rest configuration and the cables over the selected four keyframes. The cables were attached near the end effectors of each body part and also along the length of the part. Further, both the pulley positions and per-pose force magnitudes for all the cables was optimized. Note that the pulley positions of each cable is constrained in a box region around the wire structure, with FIG. 18 showing a system 1800 setup for a fabricated kinetic wire mechanism 1810 in the form of a walking dinosaur, and all the cable forces were held below 10 N. Note that the material optimization indicated a sparse set of regions for templates that lie at the joints (e.g., see dinosaur's left leg 1730 in FIG. 17) but also inside the skeleton (e.g., see the dinosaur's tail 1740 in FIG. 17). This demonstrates that a naïve approach of placing coils at the rig joints typically is not sufficient.

The inventors chose the fabricable templates, from a set of suitable ones chosen by the computational tool to replace generic templates, based on tracking performance, visual appearance, and template volume. To show the trade-off between stiffness and template volume, the cable forces on the tail were set below 1 N, and the resulting templates returned by the optimization have a large footprint. The designed kinetic wire mechanism (including mechanisms 1720, 1730, and 1740) can track the target positions with the mean matching error at 1.7 mm and a maximum error of 4.8 mm. This error is also visualized in FIG. 17 with target points 1728, 1731, and 1748 and marker points 1729, 1739, and 1749 (shown dashed). As a next step in the design process, the force magnitudes of the cables only were optimized for the complete walking cycle sequence, and across the entire animation sequence the mean error was found to be 2.1 mm.

The fabrication process described above was followed to build the wire structure for the dinosaur. To show the 3D shape of the character, wire contours were added at select locations along the skeleton (which may also be fabricated on the bending machine). These do not affect the deformation behavior. The cables were then actuated in the system 1800 using position-controlled servo motors. The fabricated wire dinosaur 1810 reproduced the input walking motion, and no plastic deformation was observed. A static pose of this dinosaur 1810 is shown in FIG. 1 (with the wire mechanism labeled 160).

Figure 19:
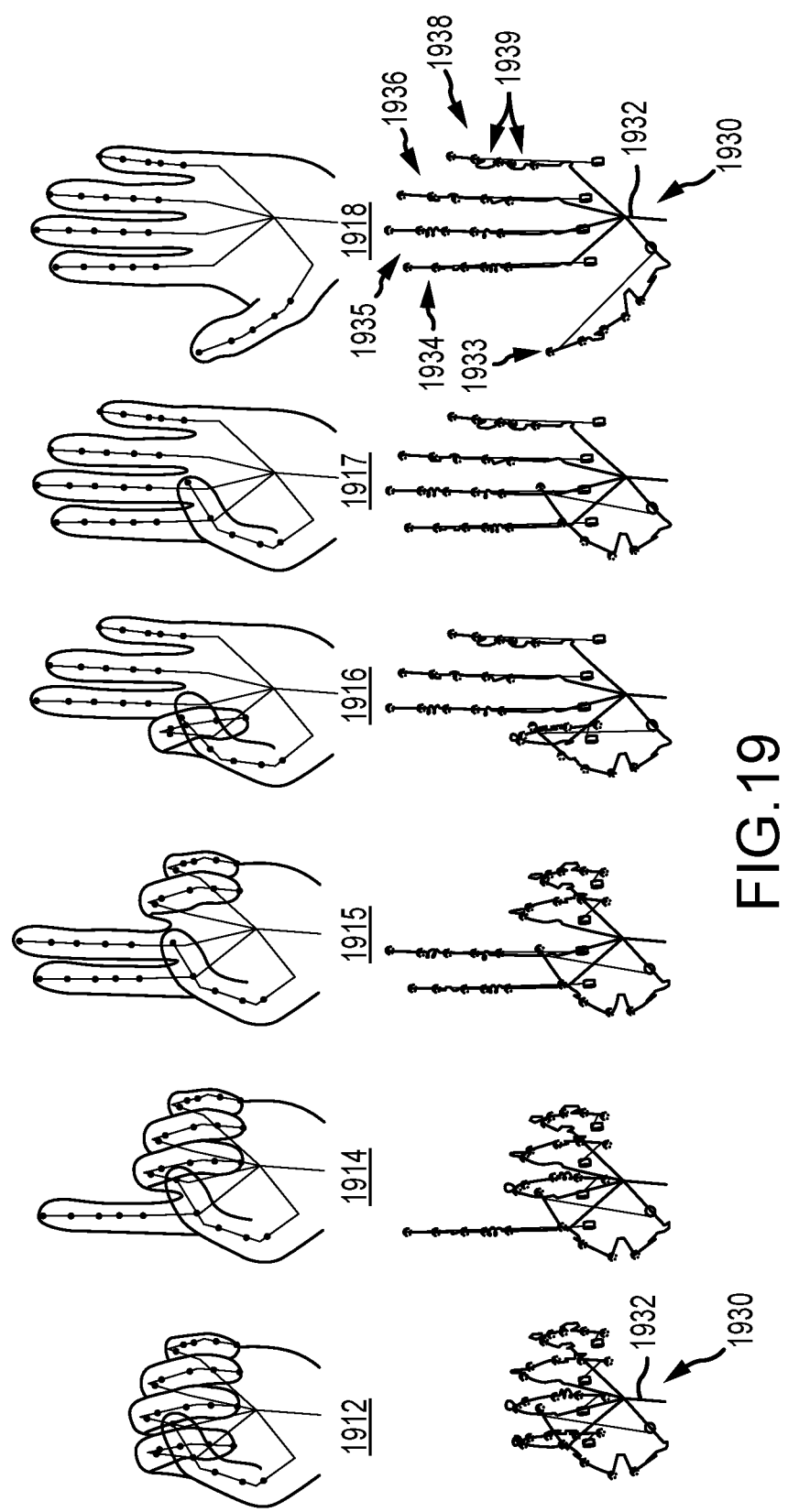
FIG. 19 illustrates, similar to FIG. 17, a design and performance tracking for kinetic wire mechanism created to provide a hand with separately positionable fingers.

As a second prototyped example, the inventors designed, with their computational tool and design method, five compliant fingers for a hand showing a counting sequence. FIG. 19 illustrates a digital file input 1910 that includes skeletal animation for the hand (i.e., a rigged hand animation with user-selected target points on the rig or skeletal links) with six keyframes 1912, 1914, 1915, 1916, 1917, and 1918 defining six targets or poses for the hand and its fingers. FIG. 19 also shows computer simulation results 1920 performed by the computational tool for a model of a kinetic wire mechanism designed by the computational tool in moving among the poses defined by the input 1910. As shown, the designed model 1930 includes a wire body 1932 with five fingers 1933, 1934, 1935, 1936, and 1938, and each of these includes a number of fabricable templates 1939 of spring-like entities that can be formed by a bending machine (or with a hand tool in the case of coil-type entities) and that allow the marker points on the body 1932 to match the target points of the input 1910 during movement among the poses.

In the prototype of the hand, the fingers 1933, 1934, 1935, 1936, and 1938 were mounted on a rigid palm, and the thumb 1933 moved spatially whereas the motions of the other four fingers 1934, 1935, 1936, and 1938 were planar. The inventors created the wire structure model 1930 by initially taking the central line from an opened hand mesh. The four keyframes 1914, 1915, 1916, and 1917 from the animation sequence 1910 of closing a hand were selected as target poses, and the inventors chose five target points on each finger in the input rig/skeleton (e.g., provide the input to defined a set of user-selected target points). For each finger, the deformation was controlled with a single cable attached at the fingertip. All the cable pulleys were constrained around the base of the finger, and the inventors set a requirement that all the cable forces stay under 5 N.

The fabricable template database search returned multiple options for each fabricable template 1930 for the wire mechanism model 1930. The illustrates model 1930 shows the inventors selected from each set of options for replacing generic templates with visually different templates 1930 for the individual fingers 1933, 1934, 1935, 1936, and 1938. The optimized hand defined by model 1930 had a maximum tracking error of 2.7 mm as measured in the simulation 1920 and a mean error of 1.6 mm across all the fingers, target points, and target poses. The fabricated hand (formed from the model 1930 via a bending machine and manual coil formation tool) was actuated manually by pulling on the cables for each finger, and the fabricated hand (or fabricated kinetic wire mechanism) replicated the complete input animation 1910 displaying organic finger gestures.

A third kinetic wire mechanism was designed and fabricated to further validate the techniques described herein, and this mechanism took the form of a magnetic climber. The magnetic climber is not shown in figures but will be understood from the figures of the finger, the dinosaur, and hand as well as the following discussion. A set of keyframes of a 3D-posed character that was climbing over a wall was taken as input, and the computational tool (design method) was used to generate a spatial structure (25 cm by 25 cm by 20 cm) that was entirely made out of wire. This mechanism matched a bind pose as the rest configuration as well as three chosen target poses from the input animation when the mechanism was actuated with potential constraints on the hands and feet (two magnets per limb) as well two cables. The magnetic climber included five coupled rods representing the spline and limbs, and the coupling between rods was simulated with soft constraints by penalizing changes in relative length and rotations of the material frames for the coupled segments.

For the optimization steps of the design process, the inventors optimized the wire structure per-pose cable force magnitudes and pulley locations (constrained to lie on the wall) and also per-pose locations of the hands and feet on the wall. Box constraints were used to prevent the hands and feet from deviating too far from the input. Using distance constraints, the inventors favored in this prototype small deviations from the rest configuration. The positional DOFs were optimized at the wrists/ankles, and the design process generated the finger and toe locations and the twists of the hand/feet from the elastic rod simulation. After optimization, the designed wire structure was found through simulations to track the input with a mean error of 3.0 mm and a maximal error of 7.6 mm across the three target poses. The magnetic climber was fabricated based on the designed model of the wire mechanism. Testing showed that the fabricated climber or kinetic wire mechanism provided good agreement between the simulated and fabricated results. This third prototype provided a full 3D example of a kinetic wire mechanism, where the rest shape of each limb was a spatial curve and the motions were spatial.

With regard to scale invariance, the design method taught herein can readily be scaled up or down, and it could also be used for different materials. The rod or wire diameter can be factored out of the integral for the bending energy so that the only term which would need to be recomputed is the yield criterion. The fabrication time does not depend on the build volume (in contrast to FDM 3D printing where a design scaled up by a factor of eight would increase fabrication time by a factor of 512). As an illustration of the scale-invariant fabrication, the inventors used the same bending machine to fabricate the optimized little finger scaled up by a factor of eight from 4 mm wire, and the fabrication time was a few minutes.

The computational tool may be provided on a wide variety of computing devices. In prototyping/testing, the simulation and three-stage optimization were performed on a machine with an Intel Core i7-7700 processor (4 cores, 4.2 GHz) with 32 GB of RAM. The inventors used KNITRO for both simulation and the constrained optimization. The performance of the three-stage optimization of the ring finger (e.g., a simple example with one cable and three fabricable templates) and the dinosaur leg (e.g., a more complex example with three cables and seven fabricable templates) is provided below in Table 1, with the errors $\bar{\epsilon}$ and $\epsilon_{max}$ computed across all target points and poses. Bending the ring finger took 75 seconds on the bending machine while it took 87 seconds to bend the leg (excluding coil templates).

TABLE 1

Key Statistics for the Three Optimization Steps (Material Optimization, Generic Template Optimization, and Fabricable Template Optimization)

| Example | opt. stage | #nodes | time (mins) | #iters | $\bar{\epsilon}$ (mm) | $\epsilon_{max}$ (mm) |
|---|---|---|---|---|---|---|
| Dino leg | mat. | 50 | 2.1 | 357 | 2.1 | 0.8 |
| | gen. temp. | 253 | 5.6 | 192 | 5.1 | 2.4 |
| | fab. temp. | 300 | 11.2 | 165 | 3.9 | 2.1 |
| Ring finger | mat. | 46 | 1.3 | 148 | 1.9 | 0.7 |
| | gen. temp. | 130 | 3.1 | 106 | 2.8 | 1.6 |
| | fab. temp. | 127 | 1.4 | 51 | 2.6 | 1.5 |

Figure 20:
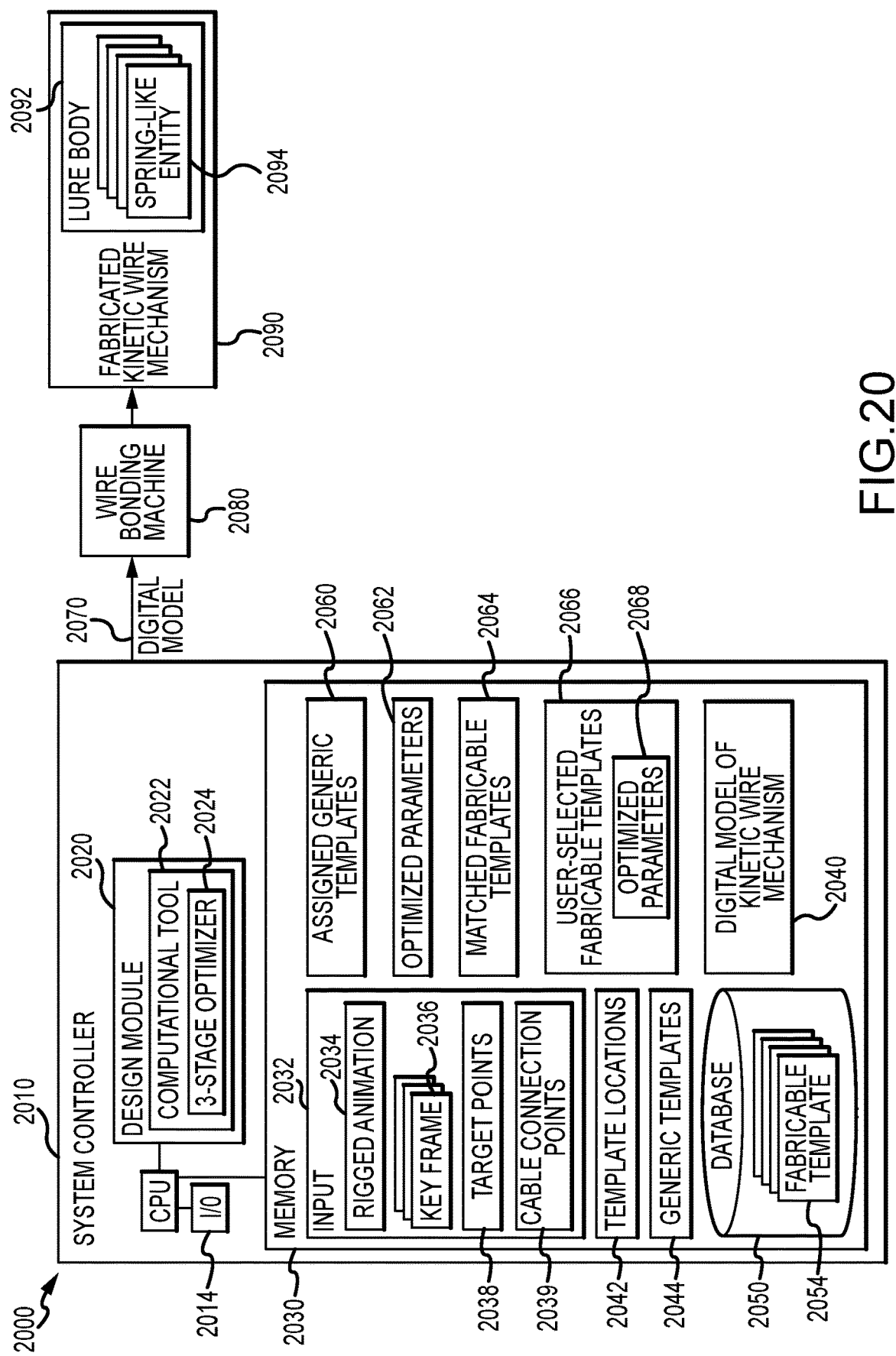
FIG. 20 is a functional block diagram of a system for use in designing and fabricating kinetic wire mechanisms according to the present description.

FIG. 20 is a functional block diagram of a system 2000 for use in designing and fabricating kinetic wire mechanisms according to the present description, e.g., to implement the method/process 300 shown in FIG. 3. The system 2000 includes a system controller 2010 that operates to generate a digital model of a wire mechanism 2070. The model 2070 is provided as input to a wire bending machine 2080, which also takes as input a length of wire (e.g., spring steel or the like). The wire bending machine 2080 operates based on the model 2070 to bend the input wire to output a fabricated kinetic wire mechanism 2090 that has a wire body with a plurality of spring-like entities 2094 that allow it to be actuated (such as with a set of cables not shown in FIG. 20) to move through a number of target poses with elastic deformation and with markers matching target points in simulation/movement of the digital model through these poses.

To create the digital model 2070, the system controller 2010 includes one or more processors 2012 that manage operations of input/output (I/O devices 2014 and manages data storage and retrieval from memory/data storage devices 2030. The processor(s) 2012 also executes code or runs software to provide/performs functions of a wire mechanism design module 2020, which includes a computational tool 2022 (as discussed above) that is configured to perform optimizations with a three-stage optimizer 2024.

The computational tool 2022 retrieves from memory 2030 (or access this data) a set of input 2032 to generate a digital model 2040 of a kinetic wire mechanism. The input 2032 initially includes a rigged animation 2034 of a moving object (or character) that is to be the basis of a fabricated kinetic wire mechanism 2090, and this will often be an animation that includes a skeleton or rig moving through a number of poses provided by a user (not shown) of the system 2000. Through the I/O devices 2014, the design module 2020 may prompt the user to select a number of keyframes 2036 from the animation 2034 that may defined an at-rest pose/configuration and a set of target poses to be performed by the wire mechanism 2090. The user may further be prompted (again via the I/O devices 2014 such as with a GUI or the like) by the design module 2020 to input or choose a set of target points 2038 on the rigging or skeleton (or its links) that the user wants the wire mechanism 2090 to follow or match (e.g., with movement of its corresponding markers) as the mechanism 2090 moves through the poses defined by the keyframes 2036. As further input 2032, the user may be prompted by the design module 2020 to choose a set of cable connection points/locations 2039 on the body of the wire mechanism 2090 (or this may be provided by a fully or semi-automatic tool in the design module 2020).

As discussed above, the memory 2030 includes one or more generic templates 2044 defining a spring-like entity that typically is not fabricable (or not readily by a bending machine or the like). Further, the memory 2030 stores a database 2050 of a plurality of templates 2054 that each define a spring-like entity that can more readily be fabricated in a length or segment of wire such as with the bending machine 2080 (i.e., are "fabricable templates"). FIG. 9 provides an exemplary set 900 of fabricable templates whose set of defining parameters may be provided in database 2050.

The computational tool 2022 with its 3-stage optimizer 2024 processes the input 2032 including the rigged animation 2034 to generate an initial digital model of a kinetic wire mechanism (such as with a set of straight links or runs of wire in place of the rig or skeleton in the animation 2034). Next the tool 2022 uses the keyframes 2036, with their definition of poses for the wire mechanism 2090, to generate (with a first stage of the optimizer 2024 as shown at 320 in process 300 of FIG. 3) a set of template locations 2042 on the digital model (e.g., along the links or runs of wire used to model the body 2092 of the wire mechanism 2090 to be fabricated), and these locations 2042 define where a spring-like entity should be positioned/provided so as to allow bending movements of the wire mechanism's body 2090. At each of these locations 2042, the computational tool 2022 places or assigns a generic template as shown at 2060. The 3-stage optimizer 2024 then acts to optimize parameters of the generic templates 2062 (as discussed above with regard to the second stage 330 of the process 300 of FIG. 3).

The computational tool 2022 then acts to choose for each of the assigned (and now optimized) generic templates 2060 one or more of the fabricable templates 2054 that have matching functions or functional ranges as that of the assigned generic template, and these are shown in memory 2030 at 2064. The user may then be prompted by the design module 2020 to choose which of these matching templates 2064 to use to replace the generic template 2060. Based on the user's selections, the design module 2020 generates a set of user-selected fabricable templates 2066 and updates the digital model 2040 to reflect their placement at the template locations 2042.

The 3-stage optimizer 2024 then acts, as shown in the third stage 350 of the process/method 300 of FIG. 3, to optimize the parameters of each of these fabricable templates 2066 (with these optimized parameters 2068 being provided or linked to the digital model and each of its fabricable templates 2066). The completed digital model 2040 can then be provided as shown at 2070 to the user for use in controlling the wire bending machine 2080 (with or without post-processing to provide coil-type spring-like entities) to form the fabricated kinetic wire mechanism 2090 with a wire body 2092 with a plurality of spring-like entities 2094 that each is configured according to a corresponding one of the user-selected (and optimized with parameters 2068) fabricable templates 2066.

Figure 21:
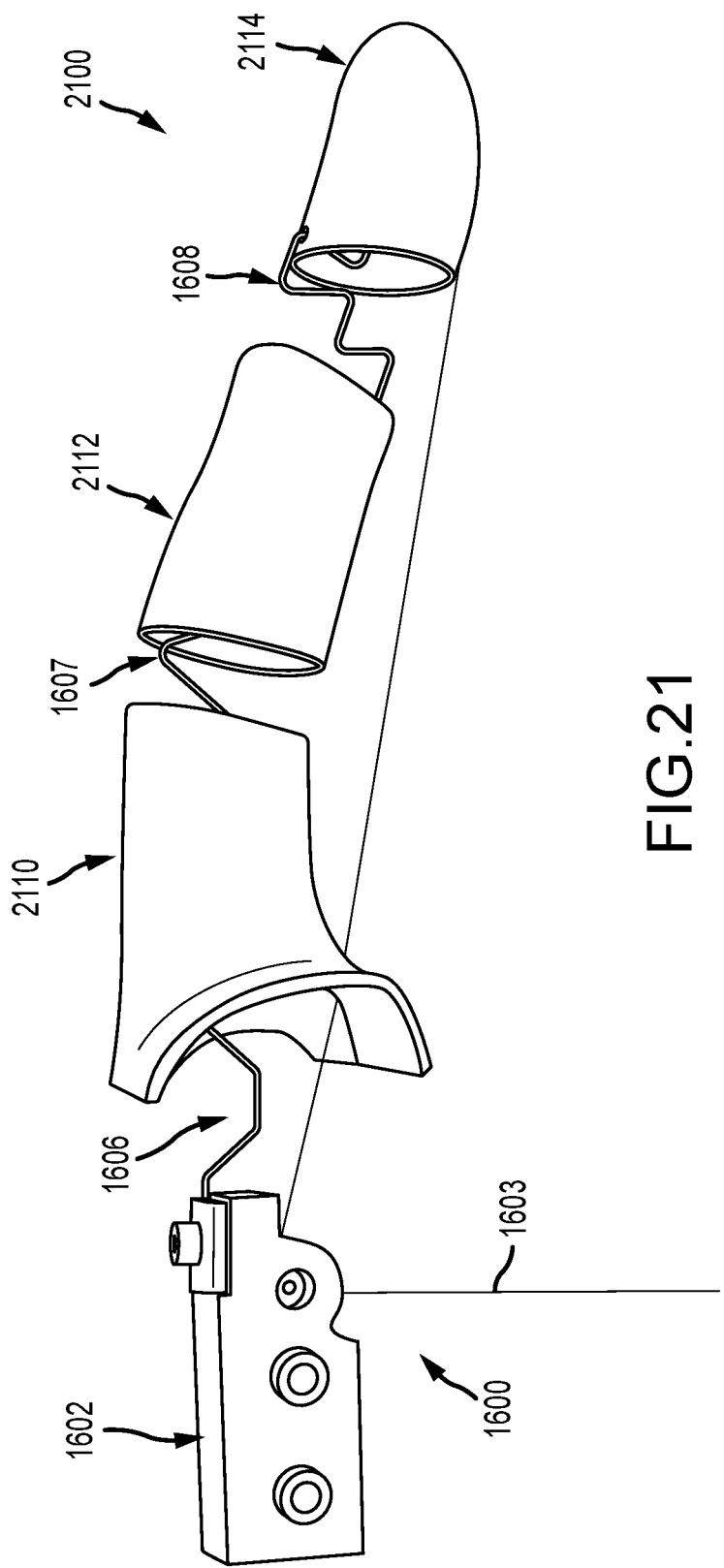
FIG. 21 illustrates a finger assembly fabricated using the wire mechanism of FIG. 16.

FIG. 21 illustrates a finger assembly 2100 illustrating more specifically use of the ideas taught herein including covering and/or enclosing the wire mechanisms and/or using the wire mechanisms as components of larger assemblies or systems. As shown, the finger assembly 2100 includes the kinetic wire mechanism 1600 of FIG. 16 with its base 1602, cable 1603, and spring-like entities 1606, 1607, and 1608 formed in wire body 1605. The wire body 1605 is covered or enclosed within three finger segments 2110, 2112, and 2114, which may be hollow or include passageways for receiving the wire body 1605.

The number of segments 2110, 2112, and 2114 matches the number of spring-like entities 1606, 1607, and 1608 to allow them to move relative to each other and the entities 1606, 1607, and 1608 may be positioned in the gaps or spaces between the segments 2110, 2112, and 2114 as shown. The segments 2110, 2112, and 2114 may be 3D printed plastic or formed using other techniques. In other embodiments, the wire body or skeleton 1605 can be embedded in a lightweight foam provided as one compliant piece (e.g., formed of an elastic material) and/or as two or more segments.

Figure 22:
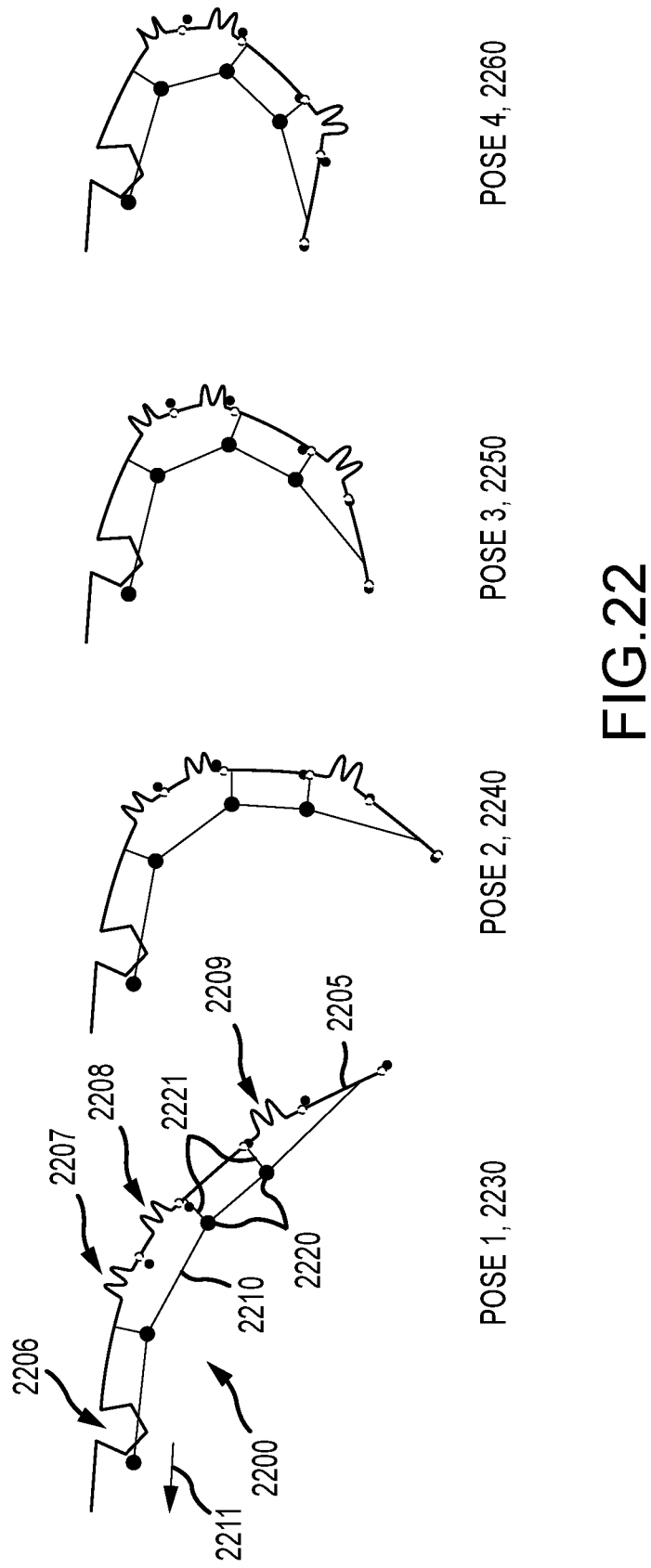
FIG. 22 illustrates another embodiment of a kinetic wire mechanism according to the present description including attached pulleys to assist in actuation.

FIG. 22 illustrates another embodiment of a kinetic wire mechanism 2200 shown being actuated or bent into four different poses 2230, 2240, 2250, and 2260 by movement 2211 of a cable 2210. The mechanism 2200 is similar to the mechanism 1600 shown in FIG. 16 but with a different wire body 2205 and with a different cable routing. As shown, the body 2205 includes four spaced-apart spring-like entities 2206, 2207, 2208, and 2209 that allow the body 2205 to be bent or to be compliant when the cable 2210 that is attached to the end of the body 2205 is pulled 2211. The cable 2210 extends along the length of the body 2205 and is spaced apart a small distance from the body 2205 via a series of spaced-apart pulleys 2220 that are coupled to the body 2205 via connectors or links 2221. The wire mechanism 2200 may be used in a finger or other assembly such as the assembly 2100 of FIG. 21 and, in this regard, may be covered or embedded with rigid coverings or segments, in a fabric covering, and/or in elastic body (e.g., a rubber foam or the like).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As discussed above, kinetic wire mechanisms are inexpensive, lightweight, and durable. There are, hence, many applications that will make use of the kinetic wire mechanisms fabricated according to techniques taught herein. These include animatronics/robotics and costume design/fabrication and large-scale applications such as set design/fabrication.

With regard to animatronics/robotics, one particular challenge is the design and manufacturing of small robotic hands. The technologies described for kinetic wire mechanisms can be used to design lightweight hands whose skeleton is made of wire and actuated by a network of cables. The wire fingers could be embedded in a soft and lightweight foam or they could be covered with cloth. Actuation forces tend to be small for wire mechanisms so that these hands would be able to work well with weaker and/or smaller motors. With regard to costume design, many costumes are worn for several hours a day in some entertainment settings. With the kinetic wire mechanism design and fabrication techniques, hands or tails or the like for costumes can be made more lightweight and durable and less expensive. A wire hand is lightweight and little force is needed to move the individual fingers, and this could lead to an overall reduction of the weight of a worn costume. With regard to set design, the approach taught herein readily scales up and relies on standard and available fabrication techniques. For large-scale applications such as set design, the new techniques could provide a new way to realize large structures with organic motions (e.g., trees or the like). In addition, it is likely that the design and fabrication of kinetic wire mechanism methods will have many architectural and mechanical engineering applications for replacing traditional and complex mechanical assemblies (e.g., in shades, awnings, and the many more products where actuated motion of components is desired).

In this description, a method has been presented for automatically generating kinetic wire characters when given an input animation. The deformation behavior of the wire of the character's body (or body parts) is controlled by introducing spring-like templates at discrete locations along the wire body, and, to solve this design problem, the method uses a novel three-stage optimization approach. In the first step, the wire geometry is unchanged while determining sparse regions in which the wire stiffness should change. In the second step, a generic template shape is inserted that closely captures the deformation behavior of fabricable templates, while providing a smooth optimization space. In the third step, fabricable templates are inserted in place of the generic ones and their parameters are directly optimized, using hard constraints to ensure fabricability. The resulting model is then used as control input for a bending machine to fabricate a kinetic wire mechanism. The fabricated characters are expressive and closely match the simulation.

The material optimization can be understood as varying stiffness properties at the microscopic scale, while the template optimization and search-and-replace strategy can be interpreted as optimization at the mesoscopic scale to achieve an overall desired macroscopic behavior. In the method (or design and fabrication system), the user specifies the number of cables and the cable attachment points along the wire body. For the prototyped characters/mechanisms, only up to three cables per limb were needed, and the gamut of the spring-like entities is rich, matching targets with high accuracy. However, some embodiments may include an additional tool to provide automated placement and testing of a cable network.

Due to the wire being thin and animated skeletons typically being collision-free, testing showed no problems with global collisions when designing the kinetic wire mechanisms. However, if collisions were a problem, one could add an additional objective to the design problem by penalizing non-local wire-wire proximity. Due to the available consumer-grade hardware, the testing of the design and fabrication method was restricted to automated fabrication of 2D and semi-automated fabrication of 3D shapes. Industrial-grade CNC benders such as the E-Flex by the BLM Group are capable of automatically fabricating 3D shapes, which would enable more complex and expressive 3D geometries to be designed and fabricated using the techniques taught herein. With the inventors' work, they have shown that locally planar templates can approximate a spatially-rich global deformation behavior. However, it is believed that these findings are readily extendable to 3D fabrication.

As demonstrated, the design and fabrication method can readily be applied at different scales. This offers exciting opportunities in a range of areas including microrobotics, furniture design, and architecture. Shape memory alloy wire can be programmed such that it changes shape when heat is applied, and this offers the potential for integrating actuation into the kinematic wire characters instead of requiring cables and remote actuation to actuate/drive the fabricated wire mechanisms.

We claim:

1. A system for design and fabrication of kinetic wire mechanisms, comprising:
    a data storage storing a skeletal animation of an object;
    a system controller running a design module processing the skeletal animation to generate a model of the object; and
    a wire bending machine,
    wherein the design module receives user input identifying a set of keyframes in the skeletal animation defining poses for the object,
    wherein the design module processes the set of keyframes to determine locations for entities on the model of the object that can be actuated to be elastically deformed into two or more positions,
    wherein the data storage further stores a database of templates of the entities that can be formed of a length of wire, by bending with a machine to have the spring functionality of the entities,
    wherein the design module identifies a set of the templates for each of the determined locations,
    wherein the wire bending machine operates to bend the length of wire based on the model of the object to fabricate a kinetic wire mechanism including a plurality of the entities with locations and configurations matching those of the templates inserted into the model of the object.

2. The system of claim 1, wherein the design module receives user input selecting one of the templates from each of the sets of the templates and wherein the design module inserts the selected one of the templates at a corresponding one of the determined locations.

3. The system of claim 1, wherein the design module determines the locations for the spring-like entities by optimizing stiffness properties for the model during bending movement through the poses defined in the set of keyframes.

4. The system of claim 3, wherein a generic template is provided in the model at each of the determined locations and wherein the design module optimizes deformation behavior of the generic templates to allow the model to move through the poses matching a set of target points on the object.

5. The system of claim 4, wherein the design module identifies the sets of templates by comparing deformation behavior of each of the templates in the database with the optimized deformation behavior of the generic templates in the model.

6. The system of claim 5, wherein the design module inserts one of the templates of each of the sets of the templates at corresponding ones of the identified locations in the model and optimizes one or more of the deformation behaviors for each of the templates in the model.

7. The system of claim 1, wherein the templates in the database include a plurality of polygonal templates of entities with spring functionalities with increasing number of sides and a plurality of twin templates of entities with spring functionalities each including two isosceles trapezoids.

8. The system of claim 1, wherein each of the templates is planar.

9. A system for design and fabrication of kinetic wire mechanisms, comprising:
- a data storage storing an animation including a set of keyframes defining differing poses for an object;
- a system controller running a computational tool that processes the animation to generate a wire structure model of the object matching the keyframes, wherein the computational tool determines locations for entities in the wire structure model to be bent with elastic deformation into two or more positions to provide movements of the object in the animation, wherein the data storage further stores a database of templates of the entities to be formed by bending a length of wire, and wherein the computational tool inserts one of the templates at each of the determined locations; and
- a wire bending machine operating to bend an input length of wire based on the wire structure model of the object to fabricate a kinetic wire mechanism including a plurality of the entities with locations and configurations matching the templates inserted into the wire structure model.

10. The system of claim 9, wherein the computational tool identifies a set of the templates for each of the determined locations, wherein the computational tool processes user input to select one of the templates from each of the sets of the templates for each of the determined locations, and wherein the design module inserts the selected one of the templates at a corresponding one of the determined locations.

11. The system of claim 9, wherein the design module determines the locations for the entities by optimizing stiffness properties for the wire structure model during movement through the poses defined in the set of keyframes.

12. The system of claim 9, wherein a generic template of one of the entities is provided in the wire structure model at each of the determined locations, wherein the computational tool optimizes parameters of the generic templates to allow the wire structure model to move through the poses matching a set of target points on the object, and wherein the design module identifies the sets of fabricable templates by comparing parameters of each of the templates in the database with the optimized parameters of the generic templates in the model.

13. The system of claim 12, wherein the computational tool inserts one of the templates of each of the sets of the templates at corresponding ones of the identified locations in the wire structure model and optimizes one or more of the parameters for each of the templates in the wire structure model.

14. The system of claim 9, wherein the templates in the database include a plurality of polygonal templates of entities with spring functionalities with increasing number of sides and a plurality of twin templates of entities with spring functionalities each including two isosceles trapezoids and wherein each of the templates is planar.

15. A method of designing a kinetic wire mechanism tailored for fabrication on a desktop bending machine, comprising:
- providing a generic template of a first entity with spring functionalities that cannot be formed via operation of a wire bending machine operating on an input length of wire and a plurality of templates of second entities that can be actuated to be elastically deformed into two or more positions and are suited for fabrication via wire bending;
- receiving as input a rig of an object and a set of target poses for the object;
- with the input, generating a wire structure model based on the rig and the set of target poses;
- identifying one or more locations for positioning the second entities in the wire structure model based on the set of target poses;
- positioning one or more of the second entities configured based on the generic template in the one or more locations;
- optimizing the positioned second entities configured based on the generic template by calibrating stiffness;
- for each of the optimized and positioned second entities, determining a matching set of the templates; and
- in the wire structure model, replacing each of the optimized and positioned second entities based on the generic template with a fabricable entity defined by one of the templates from a corresponding one of the matching sets of the templates.

16. The method of claim 15, further comprising adjusting size of the one or more of the fabricable entities.

17. The method of claim 15, wherein the templates include a plurality of polygonal templates of entities having spring functionalities with increasing number of sides and one or more templates of entities having spring functionalities each including two isosceles trapezoids and wherein each of the templates is planar and suited for fabrication with a wire bending machine.

18. The method of claim 15, wherein the optimizing of the positioned second entities configured based on the generic template includes optimizing stiffness properties of the spring-like entities, whereby the optimizing is safeguarded against inelastic deformations.

* * * * *